(12) United States Patent
Ghouti et al.

(10) Patent No.: US 8,705,740 B2
(45) Date of Patent: Apr. 22, 2014

(54) ELLIPTIC CURVE-BASED MESSAGE AUTHENTICATION CODE SYSTEM AND METHOD

(75) Inventors: Lahouari Ghouti, Dhahran (SA); Mohammad K. Ibrahim, Leicester (GB)

(73) Assignee: King Fahd University of Petroleum and Minerals, Dhahran (SA)

( * ) Notice: Subject to any disclaimer, the term of this patent is extended or adjusted under 35 U.S.C. 154(b) by 58 days.

(21) Appl. No.: 13/482,902

(22) Filed: May 29, 2012

(65) Prior Publication Data

US 2012/0237030 A1 Sep. 20, 2012

Related U.S. Application Data

(63) Continuation-in-part of application No. 12/318,501, filed on Dec. 30, 2008, now abandoned.

(51) Int. Cl.
*H04L 29/06* (2006.01)

(52) U.S. Cl.
USPC .......................................................... 380/255

(58) Field of Classification Search
USPC .......................................................... 380/255
See application file for complete search history.

(56) References Cited

U.S. PATENT DOCUMENTS

| | | | |
|---|---|---|---|
| 4,424,414 A | 1/1984 | Hellman et al. |
| 4,668,103 A | 5/1987 | Wilson |
| 4,995,082 A | 2/1991 | Schnorr |
| 5,010,573 A | 4/1991 | Musyck et al. |
| 5,054,066 A | 10/1991 | Riek et al. |
| 5,146,500 A | 9/1992 | Maurer |
| 5,150,411 A | 9/1992 | Maurer |
| 5,272,755 A | 12/1993 | Miyaji et al. |
| 5,737,424 A | 4/1998 | Eleto et al. |
| 6,307,935 B1 | 10/2001 | Crandall et al. |
| 6,816,594 B1 | 11/2004 | Okeya |
| 2003/0072443 A1 | 4/2003 | Harley et al. |
| 2005/0036621 A1 | 2/2005 | Venkatesan et al. |
| 2010/0260333 A1 | 10/2010 | Akane et al. |

FOREIGN PATENT DOCUMENTS

| | | |
|---|---|---|
| EP | 0874307 | 10/1998 |
| EP | 0892520 | 1/1999 |
| EP | 1215642 | 6/2002 |

*Primary Examiner* — Lisa Lewis
(74) *Attorney, Agent, or Firm* — Richard C. Litman

(57) ABSTRACT

The elliptic curve-based message authentication code is a computational method for improving the security of existing message authentication code (MAC) generating methods through the use of elliptic curve cryptography. Particularly, the message authentication codes and elliptic curve cryptography are based on an elliptic curve discrete logarithm problem, which is well known in mathematics to be a computationally hard problem.

6 Claims, 1 Drawing Sheet

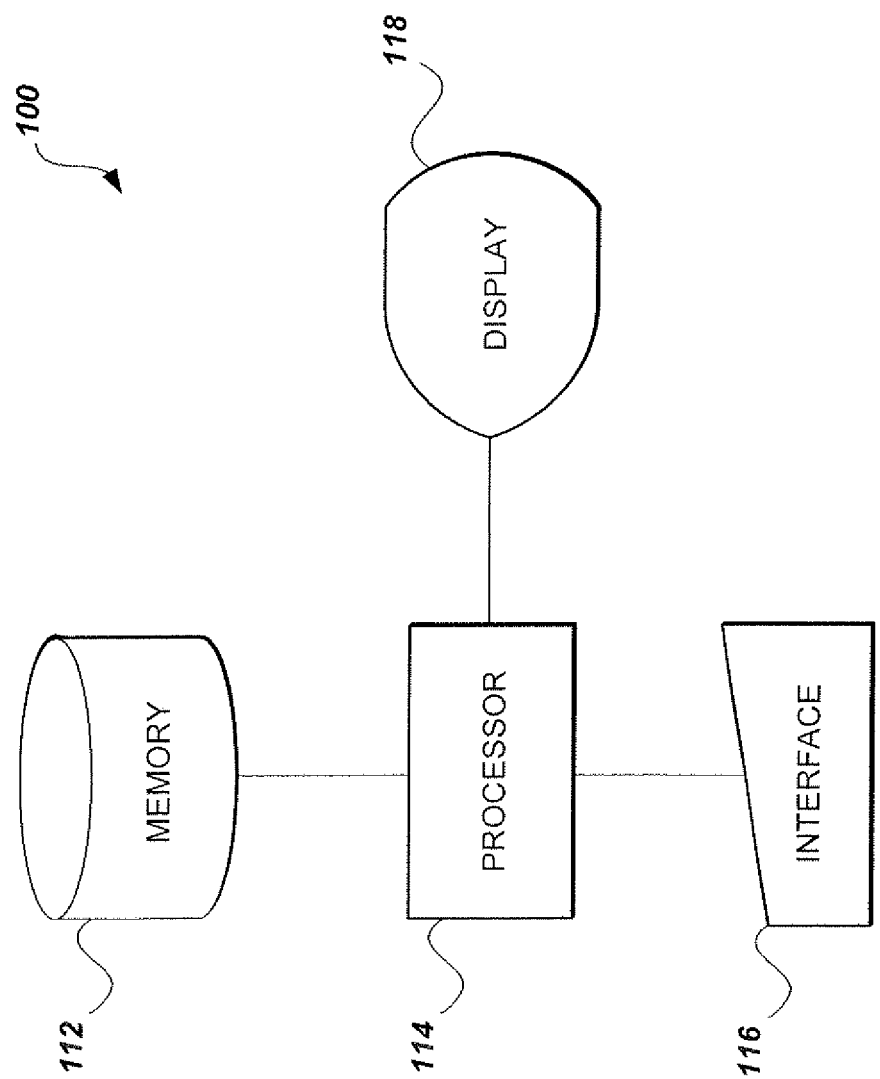

ELLIPTIC CURVE-BASED MESSAGE AUTHENTICATION CODE SYSTEM AND METHOD

CROSS-REFERENCE TO RELATED APPLICATION

This application is a continuation-in-part of U.S. patent application Ser. No. 12/318,501, filed Dec. 30, 2008.

BACKGROUND OF THE INVENTION

1. Field of the Invention

The present invention relates to computer-based cryptography systems, and particularly to an elliptic curve-based message authentication code, which relies for its security on the elliptic curve discrete logarithm problem, which is well known in mathematics to be a computationally hard problem.

2. Description of the Related Art

In recent years, the Internet community has experienced explosive and exponential growth. Given the vast and increasing magnitude of this community, both in terms of the number of individual users and web sites, and the sharply reduced costs associated with electronically communicating information, such as e-mail messages and electronic files, between one user and another, as well as between any individual client computer and a web server, electronic communication, rather than more traditional postal mail, is rapidly becoming a medium of choice for communicating information. The Internet, however, is a publicly accessible network, and is thus not secure. The Internet has been, and increasingly continues to be, a target of a wide variety of attacks from various individuals and organizations intent on eavesdropping, intercepting and/or otherwise compromising or even corrupting message traffic flowing on the Internet, or further illicitly penetrating sites connected to the Internet.

Encryption by itself provides no guarantee that an enciphered message cannot or has not been compromised during transmission or storage by a third party. Encryption does not assure integrity due to the fact that an encrypted message could be intercepted and changed, even though it may be, in any instance, practically impossible, to cryptanalyze. In this regard, the third party could intercept, or otherwise improperly access, a ciphertext message, then substitute a predefined illicit ciphertext block(s) which that party, or someone else acting in concert with that party, has specifically devised for a corresponding block(s) in the message. The intruding party could thereafter transmit the resulting message with the substituted ciphertext block(s) to the destination, all without the knowledge of the eventual recipient of the message.

The field of detecting altered communication is not confined to Internet messages. With the burgeoning use of stand-alone personal computers, individuals or businesses often store confidential information within the computer, with a desire to safeguard that information from illicit access and alteration by third parties. Password controlled access, which is commonly used to restrict access to a given computer and/or a specific file stored thereon, provides a certain, but rather rudimentary, form of file protection. Once password protection is circumvented, a third party can access a stored file and then change it, with the owner of the file then being completely oblivious to any such change.

Therefore, a need exists for a cryptographic technique that not only provides an extremely high level of security against cryptanalysis, particularly given the sophistication and power of current and future processing technology, but which is also capable of detecting a change made to a ciphertext message. Such a technique could be applied to (but is not limited in its use) secure file storage or safeguarding messages transmitted over an insecure network.

Systems and methods that provide integrity checks based on a secret key are usually called message authentication codes (MACs). Typically, message authentication codes are used between two parties that share a secret key in order to authenticate information transmitted between these parties. An adversary should be unable (with significant probability) to produce any properly authenticated message for any message that he or she has not yet seen. Typically, a party authenticates a message by appending to it the corresponding MAC. The receiving party then applies a verification procedure on the received message and its message authentication code to decide if the transmitted message is authentic. This may be accomplished by having the receiving party compute his or her own message authentication code and check to see whether the received and generated codes match.

Message authentication code methods are used widely in many applications to provide data integrity and data origin authentication. However, MACs provide weaker guarantees than digital signatures, as they can only be used in a symmetric setting, where the parties trust each other. In other words, MACs do not provide non-repudiation of origin. However, MACs are preferred over digital signatures because they are two to three orders of magnitude faster in implementation, and MAC results are four to sixteen bytes long compared to the forty to one hundred and twenty eight bytes for signatures.

In order to use a MAC, a sender and a receiver need to share a secret key k (a random bit string of $n_k$ bits with typical values for $n_k$ in the range of 56 to 128). In order to protect a message, the sender computes the MAC corresponding to the message, which is a bit-string of $n_{mac}$ bits, and appends this string to the message (typical values for $n_{mac}$ are between 32 and 64). The MAC is a complex function of every bit of the message and the key. On receipt of the message, the receiver recomputes the MAC and verifies that it corresponds to the transmitted MAC value.

With regard to the security of MAC algorithms, an opponent who tries to deceive the receiver still does not know the secret key. For this analysis, it is assumed that he knows the format of the messages, and the description of the MAC algorithm. His goal is to try to inject a fraudulent message and append a MAC value that will be accepted by the receiver. He can choose one of two attack strategies: a forgery attack or a key recovery attack. The forgery consists of predicting the value of $MAC_k(m)$ for a message m without initial knowledge of the shared key k. If the adversary can do this for a single message, he is said to be capable of "existential forgery". If the adversary is able to determine the MAC for a message of his choice, he is said to be capable of "selective forgery". Practical attacks often require that a forgery is verifiable; i.e., that the forged MAC is known to be correct beforehand with a probability near one.

A key recovery attack consists of finding the key k from a number of message/MAC pairs. Such an attack is more powerful than forgery, since it allows for arbitrary selective forgeries. Ideally, any attack allowing key recovery requires approximately $2^{n_k}$ operations (in this case, $n_k$ denotes the bit-length of k). Verification of such an attack requires $n_k/n_{mac}$ text-MAC pairs.

These attacks can be further classified according to the type of control an adversary has over the device computing the MAC value. In a chosen-text attack, an adversary may request and receive MACs corresponding to a number of messages of his choice, before completing his attack. For forgery, the forged MAC must be on a message different than any for which a MAC was previously obtained. In an adaptive chosen-text attack, requests may depend on the outcome of previous requests. It should be noted that in certain environments, such as in wholesale banking applications, a chosen message attack is not a very realistic assumption: if an opponent can choose a single text and obtain the corresponding MAC, he can already make a substantial profit. However, it is best to remain cautious and to require resistance against chosen text attacks.

In the following, various attacks on MACs are considered: brute force key searching, guessing of the MAC, a generic forgery attack, and attacks based on cryptanalysis. A brute force key search requires a few known message-MAC pairs (approximately $n_k/n_{mac}$, which is between one and four for most MAC algorithms). It is reasonable to assume that such a small number of message-MAC pairs is available. The opponent tries all the possible keys and checks whether they correspond to the given message-MAC pairs. Unlike the case of confidentiality protection, the opponent can only make use of the key if it is recovered within its active lifetime (which can be reasonably short). On the other hand, a single success during the lifetime of the system might be sufficient. This depends on a cost/benefit analysis; i.e., how much one loses as a consequence of a forgery. The only way to preclude a key search is to choose a sufficiently large key.

A second relatively simple attack is in the form of choosing an arbitrary fraudulent message, and appending a randomly chosen MAC value. Ideally, the probability that this MAC value is correct is equal to $\frac{1}{2} n_{mac}$, where $n_{mac}$ is the number of bits of the MAC value. This value should be multiplied with the expected profit corresponding to a fraudulent message, which results in the expected value of one trial. Repeated trials can increase this expected value, but in a good implementation, repeated MAC verification errors will result in a security alarm (i.e., the forgery is not verifiable). For most applications $n_{mac}$ is between 32 and 64, which is sufficient to make this attack uneconomical.

A generic forgery attack exploits the fact most MAC algorithms consist of the iteration of a simple compression function. The MAC input message m is padded to a multiple of the block size, and is then divided into t blocks denoted $m_1$ through $m_t$. The MAC involves a compression function f and an n-bit ($n \geq n_{mac}$) chaining variable $H_i$ between stage i−1 and stage i, such that $H_0$=IV; $H_i$=$f(H_{i-1}, m_i)$, where $1 \leq i \leq t$; and $MAC_k(m)$=$g(H_t)$. Here, g denotes the output transformation. The secret key may be employed in the IV, in f, and/or in g. For an input pair (m, m') with $MAC_k(m)$=$g(H_t)$ and $MAC_k(m')$=$g(H_t')$, a collision is said to occur if $MAC_k(m)$=$MAC_k(m')$. This collision is termed an internal collision if $H_t$=$H_t'$, and an external collision if $H_t \neq H_t'$, but $g(H_t)$=$g(H_t')$.

One form of general forgery attack applies to all iterated MACs. Its feasibility depends on the bit sizes n of the chaining variable and $n_{mac}$ of the MAC result, the nature of the output transformation g, and the number s of common trailing blocks of the known texts ($s \geq 0$). A simple way to preclude this attack is to append a sequence number at the beginning of every message and to make the MAC algorithm stateful. This means that the value of the sequence number is stored to ensure that each sequence number is used only once within the lifetime of the key. While this is not always practical, it has the additional advantage that it prevents replay attacks. To add more security against external collisions, the function g can include some form of additional randomization.

The above attacks assume that no shortcuts exist to break the MAC algorithm (either for forgery or for key recovery). Since most existing MAC algorithms are not based on mathematically known hard problems, it is now becoming increasingly important to have MAC methods that are based on mathematically known hard problems such as integer factorization and discrete logarithm problems.

There are, conventionally, three main approaches for MAC design that are based on: a hash function with a secret key; a block cipher with chaining (CBC-MAC); and a dedicated MAC. Compared to the number of block ciphers and hash functions, relatively few dedicated MAC algorithms have been proposed. The main reason for this is that security of dedicated MAC methods need to be evaluated from scratch in order to assess their robustness. On the other hand, the security of MAC methods that are based on well established primitives such as secure block ciphers or hash functions can be based on the security of these underlying primitives, and its security does not have to be assessed from scratch.

The availability of fast dedicated hash functions (such as MD4 and MD5, for example) has resulted in several proposals for MAC algorithms based on these functions. However, these hash functions are weaker than intended, thus they are currently being replaced by RIPEMD-160 and by SHA-1, even though these hash functions are not based on mathematically known hard problems.

One method of using hash functions for MAC is to use secret prefix and secret suffix methods such that $MAC(m)$=$h(k\|m)$ and $MAC_k(m)$=$h(m\|k)$. However, the first equation allows for extension attacks, and the second equation opens the possibility of off-line attacks.

Another method is the "secret envelope" method, which requires that $MAC_k(m)$=$h(k_1\|m\|k_2)$ (for example, Internet RFC 1828). For this method, a security proof may be performed based on the assumption that the compression function of the hash function is pseudo-random. While this is an interesting result, it should be pointed out that the compression function of most hash functions has not been evaluated with respect to this property. Further, $2^{n/2}$ known texts does not allow for a forgery or a key recovery attack. Additionally, MDx-MAC extends the envelope method by also introducing secret key material into every iteration. This makes the pseudo-randomness assumption more plausible. Moreover, it precludes the key recovery attack by extending the keys to complete blocks. HMAC is yet another variant of this methodology, which uses a nested construction (also with padded keys), such that $MAC_k(m)$=$h(k_2\|h(m\|k_1))$.

HMAC is used for providing message authentication in the Internet Protocol. The security of HMAC is guaranteed if the hash function is collision resistant for a secret value $H_0$, and if the compression function itself is a secure MAC for one block (with the secret key in the $H_i$ input and the message in the $m_i$ input). While these assumptions are weaker, it is believed that the latter assumption still requires further validation for existing hash functions. It is clear from the above that none of the current MACs based on hash functions are based on mathematically known relatively hard or difficult cryptographic problems.

Block ciphers are presently the most popular algorithms in use for providing data privacy. Block ciphers with a block size n and a key size k can be viewed as a family of permutations on the set of all n-bit strings, indexed by k-bit long encryption keys and possessing certain properties.

Some of the properties that are typically required of block ciphers are simplicity of construction and security. With regard to security, it is usually assumed that the underlying block cipher is secure and that the key size k is chosen so that an exhaustive key search is computationally infeasible. In practice, there are two issues to be considered with respect to security: (i) for a randomly chosen key k, it appears as a random permutation on the set of n-bit strings to any computationally bounded observer (i.e., one who does not have an unlimited amount of processing power available) who does not know k and who can only see encryption of a certain number of plaintexts x of their choice; and (ii) to achieve a so-called semantic security which is resistant to collision attacks such as birthday and meet-in-the-middle attacks. Such attacks have been proven to reduce an exhaustive key search significantly against block ciphers. In practice, most data units (including any typical file, database record, IP packet, or email message) that require encryption are greater in length than the block size of the chosen cipher. This will require the application of the block cipher function multiple times. The encryption of many plaintext blocks under the same key, or the encryption of plaintexts having identical parts under the same key may leak information about the corresponding plaintext. In certain situations, it is impossible to achieve semantic security. The goal then is to leak the minimum possible amount of information.

A further property is scalability. Obviously, no block cipher can be secure against a computationally unbounded attacker capable of running an exhaustive search for the unknown value of k. Furthermore, the development of faster machines will reduce the time it takes to perform an exhaustive key search. There is always a demand for more secure ciphers. It will be advantageous to develop a block cipher that is scalable so that an increase in security can be achieved by simply changing the length of the key rather than changing the block cipher algorithm itself.

Another property is efficiency. It is obvious that block ciphers are made computationally efficient to encrypt and decrypt to meet the high data rates demands of current applications such as in multimedia. Furthermore, since speed of execution is also important, it is advantageous to have block cipher that can be implemented in parallel. Of further interest is random access. Some modes allow encrypting and decrypting of any given block of the data in an arbitrary message without processing any other portions of the message.

Keying material is also an important factor in block ciphers. Some modes require two independent block cipher keys, which leads to additional key generation operations, a need for extra storage space or extra bits in communication. Additionally, of interest, are counter/IV/nonce requirements. Almost all modes make use of certain additional values together with block cipher key(s). In certain cases, such values must be generated at random or may not be reused with the same block cipher key to achieve the required security goals. Further, pre-processing capability is another important factor in block ciphers The Data Encryption Standard (DES) is a public standard and is presently the most popular and extensively used system of block encryption. DES was adopted as a federal government standard in the United States in 1977 for the encryption of unclassified information. The rapid developments in computing technology in recent years, in particular the ability to process vast amounts of data at high speed, meant that DES could not withstand the application of brute force in terms of computing power. In the late 1990's, specialized "DES cracker" machines were built that could recover a DES key after a few hours by trying possible key values. As a result, after 21 years of application, the use of DES was discontinued by the United States in 1998.

A new data encryption standard called Advanced Encryption Standard (AES) was launched in 2001 in the United States, and it was officially approved with effect from 26 May 2002. However, AES has no theoretical or technical innovation over its predecessor, DES. The basic concept remains the same and, essentially, all that has changed is that the block size n has been doubled. The AES standard specifies a block size of 128 bits and key sizes of 128, 192 or 256 bits. Although the number of 128-bit key values under AES is about $10^{21}$ times greater than the number of 56-bit DES keys, future advances in computer technology may be expected to compromise the new standard in due course. Moreover, the increase in block size may be inconvenient to implement.

Furthermore, AES is not based on known computationally hard problems, such as performing factorization or solving a discrete logarithm problem. It is known that encryption methods that are based on known cryptographic problems are usually stronger than those that are not based on such problems. Also, AES provides a limited degree of varying security, 128-bits, 192-bits and 256-bits; i.e., it not truly scalable. It should noted that to have a cipher with a higher degree of security, the cipher would probably need a completely new algorithm which will make the hardware for AES redundant. As a clear example, the hardware for DES cannot be used efficiently for AES. Also, the hardware of the 192-bits AES cipher is not completely compatible with the hardware of the other two ciphers 128-bits and 256-bits.

There are many ways of encrypting data stream that are longer than a block size, where each is referred to as a "mode of operation". Two of the standardized modes of operation employing DES are Electronic Code Book (ECB), and Cipher Block Chaining (CBC). It should be noted that the security of a particular mode should in principle be equivalent to the security of the underlying cipher. For this, we need to show that a successful attack on the mode of operation gives us almost an equally successful attack on the underlying cipher.

With regard to the ECB mode, in order to encrypt a message of arbitrary length, the message is split into consecutive n-bit blocks, and each block is encrypted separately. Encryption in ECB mode maps identical blocks in plaintext to identical blocks in ciphertext, which obviously leaks some information about plaintext. Even worse, if a message contains significant redundancy and is sufficiently long, the attacker may get a chance to run statistical analysis on the ciphertext and recover some portions of the plaintext. Thus, in some cases, security provided by ECB is unacceptably weak. ECB may be a good choice if all is need is protection of very short pieces of data or nearly random data. A typical use case for ECB is the protection of randomly generated keys and other security parameters.

With regard to CBC mode, in this mode the exclusive-or (XOR) operation is applied to each plaintext block and the previous ciphertext block, and the result is then encrypted. An n-bit initialization vector IV is used to encrypt the very first block. Unlike ECB, CBC hides patterns in plaintext. In fact, it can be proved that there is a reduction of security of CBC mode to security of the underlying cipher provided that IV is chosen at random. The computational overhead of CBC is just a single XOR operation per block encryption/decryption, so its efficiency is relatively good. Further, CBC provides random read access to encrypted data; i.e., to decrypt the i-th block, we do not need to process any other blocks. However, any change to the i-th message block would require re-encryption of all blocks with indexes greater than i. Thus, CBC does not support random write access to encrypted data.

The most serious drawback of CBC is that it has some inherent theoretical problems. For example, if $M_i$ denotes the i-th plaintext block and $C_i$ denotes the i-th ciphertext block, if one observes in a ciphertext that $C_i = C_j$, it immediately follows that $M_i$ XOR $M_j = C_{i-1}$ XOR $C_{j-1}$, where the right-hand side of the equation is known. This is called the "birthday" or matching ciphertext attack. Of course, if the underlying cipher is good in the sense of pseudorandom permutation, and its block size is sufficiently large, the probability of encountering two identical blocks in ciphertext is very low.

Another example of its security weakness is its use of XOR-based encryption. A further drawback of CBC is that its randomization must be synchronized between the sending and the receiving correspondent. CBC uses an initialization vector that must be generated at random. This initialization vector must be synchronized between the sending and receiving correspondent for correct decryption.

From the above, it is clear that the security of encrypting a sequence of message blocks using a block cipher depends on two aspects: the security of the underlying block cipher; and the effectiveness of the randomization used in reducing collision attacks when encrypting a sequence of blocks.

With regard to the security of the underlying block cipher, it is known that encryption methods that are based on computationally hard problems, such as performing factorization or solving a discrete logarithm problem, are usually stronger than those that are not based on such problems. Integer factorization can be formulated as follows: For an integer n that is the product of two primes p and q, the problem is to find the values of p and q given n only. The problem becomes harder for larger primes. The discrete logarithm problem can be formulated as follows: Given a value g and a value y whose value is equal to $g^k$ defined over a group, find the value of k. The problem becomes harder for larger groups. Although the applications of integer factorization and discrete logarithm problems in designing block ciphers is known, the resulting ciphers are computationally more demanding than those currently used, such as AES.

With regard to the effectiveness of randomization and semantic security, the one time pad is the only unconditionally semantically secure cipher presently in use. With the one time pad, the sequence of keys does not repeat itself. In other words, it is said to have an infinite cycle. However, since the sending and the receiving correspondents have to generate the same random sequence, the one time pad is impractical because of the long sequence of the non-repeating key. As a consequence, the keys to encrypt and decrypt in all private-key systems, including block ciphers, remain unchanged for every message block, or they are easily derived from each other by inference using identical random number generators at the sending and receiving correspondent. Furthermore, these generators must be initialized to the same starting point at both correspondents to ensure correct encryption and decryption. This is true of all the existing block ciphers, including the RNS encryption and decryption method discussed above.

Many methods have been proposed to construct a pseudo-random number generator or adaptive mechanisms for pseudo-random generation of permutations. Such methods include those based on tables that are used to increase randomization. However, no matter how good the randomization property of the underlying generator, it always has a finite number of states and, hence, the numbers generated by existing generators have a finite cycle where a particular sequence is repeated one cycle after other. Therefore, such block ciphers are vulnerable to collision attacks. Thus, the security of such block ciphers is very much dependant on the randomness of the random number generator. The RNS encryption and decryption method described above is not an exception. As a consequence, one can conclude that semantic insecurity is inherent in all existing block ciphers, but with varying degrees.

It the following, existing ciphers where both the sending and the receiving correspondents have to generate the same random sequence will be referred to as synchronized-randomization ciphers. Synchronized-randomization is achieved under the control of a key or some form of an initialization mechanism. Starting from this initial value, the subsequent keys are easily obtained by some form of a random number generator. Therefore, synchronized-randomization between encryption and decryption is guaranteed as long as identical random number generators are used by both correspondents and as long as the generators at both correspondents are synchronized to start from the same initial state. Thus, no unilateral change in the randomization method is allowed in synchronized-randomization.

With regard to MACs based on block ciphers, the most popular presently used MAC algorithm is the CBC-MAC; it has been adopted by many standardization committees including ANSI and ISO/IEC. It is widely used with DES as the underlying block cipher. CBC-MAC is an iterated MAC, with the following compression function: $H_i=E_k(H_{i-1} \oplus m_i)$, where $1 \leq i \leq t$. Here, $E_k(x)$ denotes the encryption of x using the $n_k$ bit key k with an n-bit block cipher E and $H_0=0$. The MAC is then computed as $MAC_k(m)=g(H_t)$, where g is the output transformation.

A widely used alternative is to replace the processing of the last block with a two-key triple encryption (with keys $k_1=k$ and $k_2$); this is commonly known as the ANSI retail MAC: $g(H_t)=E_{k_1}(D_{k_2}(H_t))=E_{k_1}(D_{k_2}(E_{k_1}(m_t \oplus H_{t-1})))$. Here, D denotes decryption. This mapping requires little overhead, and has the additional advantage that it precludes an exhaustive search against the 56-bit DES key. A second alternative is the use of a derived key k' (as opposed to a second independent key): $g(H_t)=E_k(H_t)=E_{k'}(E_k(m_t \oplus H_{t-1}))$. All of these variants, however, are vulnerable to forgery attack, which requires a single chosen message and approximately $2^{n/2}$ known messages (for DES, this corresponds to $2^{32}$ known messages). For m>n, an additional $2^{n_{mac}-n}$ 2 chosen messages are required, which makes the attack less realistic. For the ANSI retail MAC, one does not only obtain a forgery, but one can also recover the key in time $3 \cdot 2^{n_k}$ encryptions, compared to $2^{2n_k}$ encryptions for exhaustive search. If DES is used, this implies that key recovery may become feasible. Another key recovery attack needs only a single known text, but requires about $2^{n_k}$ MAC verifications. Moreover, it reduces the effective MAC size from m to $\min(n_{mac}, n_k)$. The security of the ANSI retail MAC against key recovery attacks can be improved at no cost in performance by introducing a double DES encryption in the first and last iteration. This method of improvement requires: $H_1=E_{k_2}(E_{k_1}(m_1))$ and $g(H_t)=E_{k_2'}(H_t)$. Here, $k_2'$ is derived from $k_2$.

An alternative to CBC-MAC is RIPE-MAC, which adds a feedforward: $H_i=E_k(H_{i-1} \oplus m_i) \oplus m_i$, where $1 \leq i \leq t$. This has the advantage that the round function is harder to invert (even for someone who knows the secret key). An output transformation is needed as well. XOR-MAC is another scheme based on a block cipher. It is a randomized algorithm and its security can again be reduced to that of the block cipher. It has the advantage that it is parallellizable and that small modifications to the message (and to the MAC) can be made at very low cost. The use of random bits helps to improve security, but it has a cost in practical implementations. Further, performance is typically 25% to 50% slower than CBC-MAC.

As noted above, the strength of MAC based on block cipher is dependent on the security of the underlying block cipher. Further, none of the current block ciphers are based on a known cryptographically hard problem.

Methods of adapting discrete-logarithm based algorithms to the setting of elliptic curves are known. However, finding discrete logarithms in this kind of group is particularly difficult. Thus, elliptic curve-based crypto algorithms can be implemented using much smaller numbers than in a finite-field setting of comparable cryptographic strength. Therefore, the use of elliptic curve cryptography is an improvement over finite-field based public-key cryptography.

In practice, an elliptic curve group over a finite field F is formed by choosing a pair of a and b coefficients, which are elements within F. The group consists of a finite set of points P(x,y) that satisfy the elliptic curve equation $F(x,y)=y^2-x^3-ax-b=0$, together with a point at infinity, O. The coordinates of the point, x and y, are elements of F represented in N-bit strings. In the following, a point is either written as a capital letter (e.g., point P) or as a pair in terms of the affine coordinates; i.e. (x,y).

The elliptic curve cryptosystem relies upon the difficulty of the elliptic curve discrete logarithm problem (ECDLP) to provide its effectiveness as a cryptosystem. Using multiplicative notation, the problem can be described as: given points B and Q in the group, find a number k such that $B^k=Q$; where k is the discrete logarithm of Q to the base B. Using additive notation, the problem becomes: given two points B and Q in the group, find a number k such that kB=Q.

In an elliptic curve cryptosystem, the large integer k is kept private and is often referred to as the secret key. The point Q together with the base point B are made public and are referred to as the public key. The security of the system, thus, relies upon the difficulty of deriving the secret k, knowing the public points B and Q. The main factor that determines the security strength of such a system is the size of its underlying finite field. In a real cryptographic application, the underlying field is made so large that it is computationally infeasible to determine k in a straightforward way by computing all the multiples of B until Q is found.

At the heart of elliptic curve geometric arithmetic is scalar multiplication, which computes kB by adding together k copies of the point B. Scalar multiplication is performed through a combination of point-doubling and point-addition operations. The point-addition operations add two distinct points together and the point-doubling operations add two copies of a point together. To compute, for example, $B=(2*(2*(2B)))+2B=Q$, it would take three point-doublings and two point-additions.

Addition of two points on an elliptic curve is calculated as follows: when a straight line is drawn through the two points, the straight line intersects the elliptic curve at a third point. The point symmetric to this third intersecting point with respect to the x-axis is defined as a point resulting from the addition. Doubling a point on an elliptic curve is calculated as follows: when a tangent line is drawn at a point on an elliptic curve, the tangent line intersects the elliptic curve at another point. The point symmetric to this intersecting point with respect to the x-axis is defined as a point resulting from the doubling.

Table 1 illustrates the addition rules for adding two points $(x_1,y_1)$ and $(x_2,y_2)$; i.e., $(x_3,y_3)=(x_1,y_1)+(x_2,y_2)$:

TABLE 1

| Summary of Addition Rules: $(x_3, y_3) = (x_1, y_1) + (x_2, y_2)$ | |
|---|---|
| General Equations | $x_3 = m^2 - x_2 - x_1$ <br> $y_3 = m(x_3 - x_1) + y_1$ |
| Point Addition | $m = \dfrac{y_2 - y_1}{x_2 - x_1}$ |
| Point Doubling <br> $(x_3, y_3) = 2(x_1, y_1)$ | $m = \dfrac{3x_1^2 - a}{2y_1}$ |
| $(x_2, y_2) = -(x_1, y_1)$ <br> $(x_2, y_2) = O$ <br> $-(x_1, y_1)$ | $(x_3, y_3) = (x_1, y_1) + (-(x_2, y_2)) = O$ <br> $(x_3, y_3) = (x_1, y_1) + O = (x_1, y_1)$ <br> $= (x_1, -y_1)$ |

For elliptic curve encryption and decryption, given a message point $(x_m,y_m)$, a base point $(x_B,y_B)$, and a given key, k, the cipher point $(x_C,y_C)$ is obtained using the equation $(x_C,y_C)=(x_m,y_m)+k(x_B,y_B)$.

There are two basics steps in the computation of the above equations. The first step is to find the scalar multiplication of the base point with the key, $k(x_B,y_B)$. The resulting point is then added to the message point, $(x_m,y_m)$ to obtain the cipher point. At the receiver, the message point is recovered from the cipher point, which is usually transmitted, along with the shared key and the base point $(x_m,y_m)=(x_C,y_C)-k(x_B,y_B)$.

As noted above, the x-coordinate, $x_m$, is represented as an N-bit string. However, not all of the N-bits are used to carry information about the data of the secret message. Assuming that the number of bits of the x-coordinate, $x_m$, that do not carry data is L, then the extra bits L are used to ensure that message data, when embedded into the x-coordinate, will lead to an $x_m$ value which satisfies the elliptic curve equation (1). Typically, if the first guess of $x_m$ is not on a curve, then the second or third try will be.

Thus, the number of bits used to carry the bits of the message data is (N−L). If the secret data is a K-bit string, then the number of elliptic curve points needed to encrypt the K-bit data is $$\left\lceil \frac{K}{N-L} \right\rceil.$$

It is important to note that the y-coordinate, $y_m$, of the message point carries no data bits.

Given a cubic equation in x defined over a finite field, F(p), of the form, $t=x^3+ax+b$, where $x \in F(p)$ $t \in F(p)$ $a \in F(p)$ and $b \in F(p)$, then any value of x will lead to a value of $t \in F(p)$. It should be noted that t could be either quadratic residue or non-quadratic residue. If t is quadratic residue, it can be written as $t=y^2$, and if t is non-quadratic residue, it can be written as $t=\overline{\alpha}y^2$ where $\overline{\alpha}$ is a non-quadratic element of F(p); i.e., $$\sqrt{\overline{\alpha}} \notin F(p).$$

Thus, equation (5), can be written as $\alpha y^2=x^3+ax+b$, where $\alpha=1$ if t is quadratic residue, and $\alpha=\overline{\alpha}$ if t is non-quadratic residue.

It should be noted that for a specific coefficient $a,b \in F(p)$ that when $\alpha=1$, the resulting curve is an elliptic curve. However, if $\alpha=\overline{\alpha}$, this leads to a twist of the elliptic curve obtained with $\alpha=1$. Thus, any value of $x \in F(p)$ will lead to a point $(x, \sqrt{\alpha}y)$ that is either on an elliptic curve or its twist. If $\alpha=1$, the point $(x,\sqrt{\alpha}y)$ is on the elliptic curve. If $\alpha=\overline{\alpha}$, the point $(x, \sqrt{\alpha}y)$ is on its twist.

Elliptic points can be formulated on a twist of an elliptic curve in the same fashion as they are formulated for elliptic curves. As result, elliptic curve cryptography can also be defined on twists of elliptic curves in the same manner as that described above. Equations for point addition on an elliptic curve or its twist are given in Table 2 below. If $\alpha=1$, the equations are for point addition on an elliptic curve, and when $\alpha=\overline{\alpha}$, the equations are for point addition on its twist.

TABLE 2

Summary of Addition Rules on elliptic curves or their twists:
$(x_3, \sqrt{\alpha}y_3) = (x_1, \sqrt{\alpha}y_1) + (x_2, \sqrt{\alpha}y_2)$

| General Equations | $x_3 = m^2 - x_2 - x_1$ |
| --- | --- |
| | $\sqrt{\alpha}y_3 = m(x_3 - x_1) + \sqrt{\alpha}y_1$ |
| Point Addition | $m = \sqrt{\alpha}\dfrac{y_2 - y_1}{x_2 - x_1}$ |
| Point Doubling $(x_3, y_3) = 2(x_1, y_1)$ | $m = \dfrac{3x_1^2 - a}{2\sqrt{\alpha}\,y_1}$ |

$(x_2, \sqrt{\alpha}y_2) = -(x_1, \sqrt{\alpha}y_1)$   $(x_3, \sqrt{\alpha}y_3) = (x_1, \sqrt{\alpha}y_1) + (-(x_2, \sqrt{\alpha}y_2)) = O$
$(x_2, \sqrt{\alpha}y_2) = O$   $(x_3, \sqrt{\alpha}y_3) = (x_1, \sqrt{\alpha}y_1) + O = (x_1, \sqrt{\alpha}y_1)$
$-(x_1, \sqrt{\alpha}y_1)$   $= (x_1, -\sqrt{\alpha}y_1)$ Encryption and decryption equation are modified accordingly:

$(x_C, \sqrt{\alpha}y_C) = (x_m, \sqrt{\alpha}y_m) + k(x_B, \sqrt{\alpha}y_B);$
and $(x_m, \sqrt{\alpha}y_m) = (x_C, \sqrt{\alpha}y_C) - k(x_B, \sqrt{\alpha}y_B).$ When $\alpha=1$, the equations are the cryptography equations over an elliptic curve, and when $\alpha=\overline{\alpha}$, they define the cryptography equations over its twist. An attack method referred to as power analysis exists, in which the secret information is decrypted on the basis of leaked information. An attack method in which change in voltage is measured in cryptographic processing using secret information, such as DES (Data Encryption Standard) or the like, such that the process of the cryptographic processing is obtained, and the secret information is inferred on the basis of the obtained process is known. As one of the measures against power analysis attack on elliptic curve cryptosystems, a method using randomized projective coordinates is known. This is a measure against an attack method of observing whether a specific value appears or not in scalar multiplication calculations, and inferring a scalar value from the observed result. By multiplication with a random value, the appearance of such a specific value is prevented from being inferred. In the above-described elliptic curve cryptosystem, attack by power analysis, such as DPA or the like, was not taken into consideration. Therefore, in order to relieve an attack by power analysis, extra calculation has to be carried out using secret information in order to weaken the dependence of the process of the cryptographic processing and the secret information on each other. Thus, time required for the cryptographic processing increases so that cryptographic processing efficiency is lowered.

With the development of information communication networks, cryptographic techniques have been indispensable elements for the concealment or authentication of electronic information. Efficiency in terms of computation time is a necessary consideration, along with the security of the cryptographic techniques. The elliptic curve discrete logarithm problem is so difficult that elliptic curve cryptosystems can make key lengths shorter than that in Rivest-Shamir-Adleman (RSA) cryptosystems, basing their security on the difficulty of factorization into prime factors. Thus, the elliptic curve cryptosystems offer comparatively high-speed cryptographic processing with optimal security. However, the processing speed is not always high enough to satisfy smart cards, for example, which have restricted throughput or servers that have to carry out large volumes of cryptographic processing.

The pair of equations for m in Table 1 are referred to as "slope equations". Computation of a slope equation in finite fields requires one finite field division. Alternatively, the slope computation can be computed using one finite field inversion and one finite field multiplication. Finite field division and finite field inversion are costly in terms of computational time because they require extensive CPU cycles for the manipulation of two elements of a finite field with a large order. Presently, it is commonly accepted that a point-doubling and a point-addition operation each require one inversion, two multiplications, a square, and several additions. At present, there are techniques to compute finite field division and finite field inversion, and techniques to trade time-intensive inversions for multiplications through performance of the operations in projective coordinates.

In cases where field inversions are significantly more time intensive than multiplication, it is efficient to utilize projective coordinates. An elliptic curve projective point (X,Y,Z) in conventional projective (or homogeneous) coordinates satisfies the homogeneous Weierstrass equation: $\tilde{F}(X,Y,Z) = Y^2Z - X^3 - aXZ^2 - bZ^3 = 0$, and, when $Z \neq 0$, it corresponds to the affine point $$(x, y) = \left(\frac{X}{Z}, \frac{Y}{Z}\right).$$

Other projective representations lead to more efficient implementations of the group operation, such as, for example, the Jacobian representations, where the triplets (X,Y,Z) correspond to the affine coordinates $$(x, y) = \left(\frac{X}{Z^2}, \frac{Y}{Z^3}\right)$$

whenever $Z \neq 0$. This is equivalent to using a Jacobian elliptic curve equation that is of the form $\tilde{F}(X,Y,Z) = Y^2 - X^3 - aXZ^4 - bZ^6 = 0$.

Another commonly used projection is the Chudnovsky-Jacobian coordinate projection. In general terms, the relationship between the affine coordinates and the projection coordinates can be written as $$(x, y) = \left(\frac{X}{Z^i}, \frac{Y}{Z^j}\right)$$

where the values of i and j depend on the choice of the projective coordinates. For example, for homogeneous coordinates, i=1 and j=1.

The use of projective coordinates circumvents the need for division in the computation of each point addition and point doubling during the calculation of scalar multiplication. Thus, finite field division can be avoided in the calculation of scalar multiplication, $$k\left(\frac{X_B}{Z_B^i}, \frac{Y_B}{Z_B^j}\right),$$

when using projective coordinates.

The last addition for the computation of the cipher point, $$\left(\frac{X_C}{Z_C^i}, \frac{Y_C}{Z_C^j}\right);$$

i.e., the addition of the two points $$\left(\frac{X_m}{Z_m^i}, \frac{Y_m}{Z_m^j}\right) \text{ and } k\left(\frac{X_B}{Z_B^i}, \frac{Y_B}{Z_B^j}\right),$$

can also be carried out in the chosen projection coordinate:

$$\left(\frac{X_C}{Z_C^i}, \frac{Y_C}{Z_C^j}\right) = \left(\frac{X_m}{Z_m^i}, \frac{Y_{m1}}{Z_m^j}\right) + \left(\frac{X_B}{Z_B^i}, \frac{Y_B}{Z_B^j}\right).$$

It should be noted that $Z_m = 1$.

However, one division (or one inversion and one multiplication) must still be carried out in order to calculate $$x_C = \frac{x_C}{Z_C^i},$$

since only the affine x-coordinate of the cipher point, $x_C$, is sent by the sender.

Thus, the encryption of (N−L) bits of the secret message using elliptic curve encryption requires at least one division when using projective coordinates. Similarly, the decryption of a single message encrypted using elliptic curve cryptography also requires at least one division when using projective coordinates.

As noted above, authentication code methods based on known mathematically difficult problems, such as the discrete logarithm problem, are more secure than those that are not based on such problems. The difficulty of using elliptic curve cryptography to develop authentication codes is in the iterative and non-deterministic method needed to embed a bit string into an elliptic curve point. Further, the iterative embedding methods used in existing elliptic curve cryptography have the additional drawback of the number of iterations needed being different for different bit strings that are being embedded. As a consequence, different encryption times are needed for different blocks of bit strings. Such a data dependant encryption time is not suitable for authentication codes, which require data independent generation time.

Thus, an elliptic curve-based message authentication code system and method solving the aforementioned problems is desired.

SUMMARY OF THE INVENTION

The elliptic curve-based message authentication code provides a computational method for improving the security of existing message authentication code (MAC) generating methods through the use of elliptic curve cryptography. Particularly, the message authentication codes and elliptic curve cryptography are based on the elliptic curve discrete logarithm problem, which is well known in mathematics to be a computationally hard problem.

In a first embodiment of the method authentication code generation method, the following steps are implemented:

a) coefficients $a, b \in F$ are specified, along with a base point on an elliptic curve, $(x_B, y_B) \in EC$, and a base point on its twist, $$(x_{TB}, \sqrt{\alpha}\, y_{TB}) \in TEC.$$

Both the sending and receiving correspondents agree on a random number k, which will be the shared secret key for communication, and $(x_B, y_B)$ and $$(x_{TB}, \sqrt{\alpha}\, y_{TB});$$

the sending correspondent then performs the following steps:

b) embedding the bit string of the shared secret key into the x-coordinate of the key elliptic point $(x_k, \sqrt{\alpha_k}\, y_k)$ using the non-iterative embedding method to be described below;

c) if $(x_k, \sqrt{\alpha_k}\, y_k)$ is on the elliptic curve; i.e., $\alpha_k = 1$, then compute the scalar multiplication $$(x_{TS_0}, \sqrt{\alpha}\, y_{TS_0}) = k(x_{TB}, \sqrt{\alpha}\, y_{TB}),$$

and set $(s_{S_0}, y_{S_0}) = (x_k, y_k)$, and if $\alpha_k = \overline{\alpha}$, then compute the scalar multiplication $(x_{S_0}, y_{S_0}) = k(x_B, y_B)$ and set $$(x_{TS_0}, \sqrt{\alpha}\, y_{TS_0}) = (x_k, \sqrt{\alpha}\, y_k);$$

d) embedding the message N-bit string of the initial block, which is termed the 0-th block, into the x-coordinate of the elliptic message point $(x_{m_0}, \sqrt{\alpha_{m_0}}\, y_{m_0})$ using the non-iterative embedding method to be described below;

e) if the message point of the 0-th block is on the elliptic curve; i.e. $\alpha_{m_0} = 1$, the MAC points are computed using $(x_{c_0}, y_{c_0}) = (x_{m_0}, y_{m_0}) + (x_{S_0}, y_{S_0})$ and $$(x_{Tc_0}, \sqrt{\alpha}\, y_{Tc_0}) = (x_{TS_0}, \sqrt{\alpha}\, y_{TS_0}),$$

otherwise they are computed using $$(x_{Tc_0}, \sqrt{\alpha}\, y_{Tc_0}) = (x_{m_0}, \sqrt{\alpha}\, y_{m_0}) + (x_{TS_0}, \sqrt{\alpha}\, y_{TS_0})$$

and $(x_{c_0}, y_{c_0}) = (x_{S_0}, y_{S_0})$.

Starting with $i=1$, the following steps f) through h) are repeated until $i > u$:

f) embedding the message N-bit string of the i-th block into the x-coordinate of the elliptic message point $(x_{m_i}, \sqrt{\alpha_{m_i}}\, y_{m_i})$ using the non-iterative embedding method described below;

g) if the message point of the i-th block is on the elliptic curve; i.e., $\alpha_{m_i} = 1$, the MAC points are computed using $(x_{c_i}, y_{c_i}) = (x_{m_i}, y_{m_i}) + (x_{c_{i-1}}, y_{c_{i-1}})$ and $$(x_{Tc_i}, \sqrt{\alpha}\, y_{Tc_i}) = (x_{Tc_{i-1}}, \sqrt{\alpha}\, y_{Tc_{i-1}}),$$

otherwise they are computed using $$(x_{Tc_i}, \sqrt{\alpha}\, y_{Tc_i}) = (x_{m_i}, \sqrt{\alpha}\, y_{m_i}) + (x_{Tc_{i-1}}, \sqrt{\alpha}\, y_{Tc_{i-1}})$$

and $(x_{c_i}, y_{c_i}) = (x_{c_{i-1}}, y_{c_{i-1}})$;

h) the appropriate bits of the x-coordinate $x_c$ and the sign bit of the y-coordinate $y_c$ of the MAC point $(x_{c_u}, y_{c_u})$, and the appropriate bits of the x-coordinate $x_{Tc}$ and the sign bit of the y-coordinate $y_{Tc}$ of the MAC point $$(x_{Tc_u}, \sqrt{\alpha}\, y_{Tc_u})$$

are concatenated together to form the MAC, which is appended to the message to be sent together with, if necessary, any additional information needed to help authenticate the message bit string at the receiving correspondent without compromising security and sent to the receiving correspondent.

At the receiving correspondent, the following steps are performed:

i) embedding the bit string of the secret key into the x-coordinate of the key elliptic point $(x_k, \sqrt{\alpha_k} y_k)$ using the non-iterative embedding method described below;

j) if $(x_k, \sqrt{\alpha_k} y_k)$ is on the elliptic curve; i.e., $\alpha_k=1$, then compute the scalar multiplication $$(x_{TS_0}, \sqrt{\alpha}\, y_{TS_0}) = k(x_{TB}, \sqrt{\alpha}\, y_{TB})$$

and set $(x_{S_0}, y_{S_0})=(x_k, y_k)$, otherwise if $\alpha_k=\alpha_o$, then compute the scalar multiplication $(x_{S_0}, y_{S_0})=k(x_B, y_B)$ and set $$(x_{TS_0}, \sqrt{\alpha}\, y_{TS_0}) = (x_k, \sqrt{\alpha}\, y_k);$$

k) embedding the received message N-bit string of the initial block, which is termed the 0-th block, into the x-coordinate of the received message elliptic point $(x_{rm_0}, \sqrt{\alpha_{rm_0}} y_{rm_0})$ using the non-iterative embedding method described below;

l) if the message point of the 0-th block is on the elliptic curve; i.e., $\alpha_{rm_0}=1$, the MAC points are computed using $(x_{rc_0}, y_{rc_0})=(x_{rm_0}, y_{rm_0})+(x_{S_0}, y_{S_0})$ and $$(x_{rTc_0}, \sqrt{\alpha}\, y_{rTc_0}) = (x_{TS_0}, \sqrt{\alpha}\, y_{TS_0}),$$

otherwise they are computed using $$(x_{rTc_0}, \sqrt{\alpha}\, y_{rTc_0}) = (x_{rm_0}, \sqrt{\alpha}\, y_{rm_0}) + (x_{TS_0}, \sqrt{\alpha}\, y_{TS_0})$$

and $(x_{rc_0}, y_{rc_0})=(x_{S_0}, y_{S_0})$.

Starting with $i=1$, the following steps m) through p) are repeated until $i>u$:

m) embedding the message N-bit string of the i-th block into the x-coordinate of the elliptic message point $(x_{rm_i}, \sqrt{\alpha_{rm_i}} y_{rm_i})$ using the non-iterative embedding method described below;

n) if the message point of the i-th block is on the elliptic curve; i.e., $\alpha_{rm_i}=1$, then the MAC points are computed using $(x_{rc_i}, y_{rc_i})=(x_{rm_i}, y_{rm_i})+(x_{S_i}, y_{S_i})$ and $$(x_{rTc_i}, \sqrt{\alpha}\, y_{rTc_i}) = (x_{rTc_{i-1}}, \sqrt{\alpha}\, y_{rTc_{i-1}}),$$

otherwise they are computed using $$(x_{rTc_i}, \sqrt{\alpha}\, y_{rTc_i}) = (x_{rm_i}, \sqrt{\alpha}\, y_{rm_i}) + (x_{rTc_{i-1}}, \sqrt{\alpha}\, y_{rTc_{i-1}})$$

and $(x_{rc_i}, y_{rc_i})=(x_{rc_{i-1}}, y_{rc_{i-1}})$;

o) the appropriate bits of the x-coordinate $x_{rc}$ and the sign bit of the y-coordinate $y_{rc}$ of the MAC point $(x_{rc_u}, y_{rc_u})$, and the appropriate bits of the x-coordinates $x_{rTc}$ and the sign bit of the y-coordinate $y_{rTc}$ of the MAC point $$(x_{rTc_u}, \sqrt{\alpha}\, y_{rTc_u})$$

are concatenated together to form the MAC of the received message; and p) if the received MAC is equal to the MAC of the received message generated at the receiving correspondent, then the received message is authenticated.

These and other features of the present invention will become readily apparent upon further review of the following specification and drawings.

BRIEF DESCRIPTION OF THE DRAWINGS

The sole FIGURE is a block diagram illustrating system components for performing an elliptic curve-based message authentication code according to the present invention.

Similar reference characters denote corresponding features consistently throughout the attached drawings.

DETAILED DESCRIPTION OF THE PREFERRED EMBODIMENTS

The elliptic curve-based message authentication code (MAC) is based on the elliptic curve discrete logarithm problem, which is well known in mathematics to be a computationally hard problem.

As will be described in greater detail below, the MACs utilize both an elliptic curve and its twist simultaneously in a single encryption method, even if the elliptic curve and its twist are not isomorphic to each other. Since the MAC generation methods use both an elliptic curve and its twist, any bit strings can be embedded in a non-iterative manner into a point, which is either on an elliptic curve or its twist. In other words, the time needed to embed a bit string into a point is always the same and is independent of the string's constituent bits. This leads to the advantage of having the same MAC generation time independent of the bit strings being processed.

The difficulty of using conventional elliptic curve cryptography to develop MACs is in the iterative and non-deterministic method needed to embed a bit string into an elliptic curve point, which has the drawback of the number of iterations needed to embed a bit string into a point being different for different bit strings that are being embedded. As a consequence, different MAC generation times are needed for different blocks of bit strings. Such a data dependant generation time is not suitable for MAC generation methods, as it will require data buffers with unpredictable lengths. The time needed to generate a MAC for a bit string of a given length should be independent of the values of the constituents' bits. Such is not possible using conventional elliptic curve cryptography. Further, in conventional elliptic curve cryptography, given an elliptic curve defined over a finite filed that requires N-bits for the representation of its elements, only (N−L) bits of the message data bits can be embedded in any elliptic curve point.

The present elliptic curve cryptography-based MAC method overcomes the disadvantage of the MAC generation time being dependent on the constituents' bits of the string being processed, as will be described in greater detail below. In other words, the time needed to generate a MAC for a bit string of a given length using the present method is independent of the values of the constituents' bits. Furthermore, up to N bits (i.e., more than (N−L) bits) can be embedded in each elliptic curve point.

Further, as will be described in greater detail below, projective coordinates are used at the sending and receiving entities to eliminate the inversion or division during each point addition and doubling operation of the necessary scalar multiplication. Additionally, the present elliptic curve cryptography-based MAC methods are scalable.

In a message authentication code, a shared secret key or keys are used to encrypt and decrypt the message data bits. In the following, it is assumed that the maximum block size that can be embedded into the x-coordinate is N bits, and that the compressed media data bit string length is a multiple of N, such as (u+1)N. In other words, the number of N-bit blocks in a message bit string is (u+1).

Given $\bar{\alpha} \in F(p)$, a non-quadratic residue element of F(p) (i.e., $$\sqrt{\bar{\alpha}} \notin F(p)),$$

a point that could be either on an elliptic curve, $y^2 = x^3 + ax + b$, or its twist, $\bar{\alpha}y^2 = x^3 + ax + b$, can be represented as $(x, \sqrt{\alpha}y)$, where $\alpha$ is either equal to 1 or $\alpha_o$. If $\alpha = 1$, then the point $(x, \sqrt{\alpha}y)$ lies on an elliptic curve, and if $\alpha = \bar{\alpha}$, the point lies on its twist. In the following, EC represents the set of points that satisfy an elliptic curve equation, and TEC represents the set of points that satisfy its twist.

In a first embodiment of the method authentication code generation method, the following steps are implemented:

a) coefficients $a, b \in F$ are specified, along with a base point on an elliptic curve, $(x_B, y_B) \in EC$, and a base point on its twist, $$(x_{TB}, \sqrt{\bar{\alpha}} y_{TB}) \in TEC.$$

Both the sending and receiving correspondents agree on a random number k, which will be the shared secret key for communication, and $(x_B, y_B)$ and $$(x_{TB}, \sqrt{\bar{\alpha}} y_{TB});$$

the sending correspondent then performs the following steps:

b) embedding the bit string of the shared secret key into the x-coordinate of the key elliptic point $(x_k, \sqrt{\alpha_k} y_k)$ using the non-iterative embedding method to be described below;

c) if $(x_k, \sqrt{\alpha_k} y_k)$ is on the elliptic curve; i.e., $\alpha_k = 1$, then compute the scalar multiplication $$(x_{TS_0}, \sqrt{\bar{\alpha}} y_{TS_0}) = k(x_{TB}, \sqrt{\bar{\alpha}} y_{TB}),$$

and set $(x_{S_0}, y_{S_0}) = (x_k, y_k)$, and if $\alpha_k = \alpha_o$, then compute the scalar multiplication $(x_{S_0}, y_{S_0}) = k(x_B, y_B)$ and set $$(x_{TS_0}, \sqrt{\bar{\alpha}} y_{TS_0}) = (x_k, \sqrt{\bar{\alpha}} y_k);$$

d) embedding the message N-bit string of the initial block, which is termed the 0-th block, into the x-coordinate of the elliptic message point $(x_{m_0}, \sqrt{\alpha_{m_0}} y_{m_0})$ using the non-iterative embedding method to be described below;

e) if the message point of the 0-th block is on the elliptic curve; i.e. $\alpha_{m_0} = 1$, the MAC points are computed using $(x_{C_0}, y_{C_0}) = (x_{m_0}, y_{m_0}) + (x_{S_0}, y_{S_0})$ and $$(x_{Tc_0}, \sqrt{\bar{\alpha}} y_{Tc_0}) = (x_{TS_0}, \sqrt{\bar{\alpha}} y_{TS_0}),$$

otherwise they are computed using $$(x_{Tc_0}, \sqrt{\bar{\alpha}} y_{Tc_0}) = (x_{m_0}, \sqrt{\bar{\alpha}} y_{m_0}) + (x_{TS_0}, \sqrt{\bar{\alpha}} y_{TS_0})$$

and $(x_{C_0}, y_{C_0}) = (x_{S_0}, y_{S_0})$.

Starting with i=1, the following steps f) through h) are repeated until i>u:

f) embedding the message N-bit string of the i-th block into the x-coordinate of the elliptic message point $(x_{m_i}, \sqrt{\alpha_{m_i}} y_{m_i})$ using the non-iterative embedding method described below;

g) if the message point of the i-th block is on the elliptic curve; i.e., $\alpha_{m_i} = 1$, the MAC points are computed using $(x_{c_i}, y_{c_i}) = (x_{m_i}, y_{m_i}) + (x_{c_{i-1}}, y_{c_{i-1}})$ and $$(x_{Tc_i}, \sqrt{\bar{\alpha}} y_{Tc_i}) = (x_{Tc_{i-1}}, \sqrt{\bar{\alpha}} y_{Tc_{i-1}}),$$

otherwise they are computed using $$(x_{Tc_i}, \sqrt{\bar{\alpha}} y_{Tc_i}) = (x_{m_i}, \sqrt{\bar{\alpha}} y_{m_i}) + (x_{Tc_{i-1}}, \sqrt{\bar{\alpha}} y_{Tc_{i-1}})$$

and $(x_{c_i}, y_{c_i}) = (x_{c_{i-1}}, y_{c_{i-1}})$;

h) the appropriate bits of the x-coordinate $x_c$ and the sign bit of the y-coordinate $y_c$ of the MAC point $(x_{c_u}, y_{c_u})$, and the appropriate bits of the x-coordinate $x_{Tc}$ and the sign bit of the y-coordinate $y_{Tc}$ of the MAC point $$(x_{Tc_u}, \sqrt{\bar{\alpha}} y_{Tc_u})$$

are concatenated together to form the MAC, which is appended to the message to be sent together with, if necessary, any additional information needed to help authenticate the message bit string at the receiving correspondent without compromising security and sent to the receiving correspondent.

At the receiving correspondent, the following steps are performed:

i) embedding the bit string of the secret key into the x-coordinate of the key elliptic point $(x_k, \sqrt{\alpha_k} y_k)$ using the non-iterative embedding method described below;

j) if $(x_k, \sqrt{\alpha_k} y_k)$ is on the elliptic curve; i.e., $\alpha_k = 1$, then compute the scalar multiplication $$(x_{TS_0}, \sqrt{\bar{\alpha}} y_{TS_0}) = k(x_{TB}, \sqrt{\bar{\alpha}} y_{TB})$$

and set $(x_{S_0},y_{S_0})=(x_k,y_k)$, otherwise if $\alpha_k=\alpha_o$, then compute the scalar multiplication $(x_{S_0},y_{S_0})=k(x_B,y_B)$ and set $$(x_{TS_0}, \sqrt{\alpha}\, y_{TS_0}) = (x_k, \sqrt{\alpha}\, y_k);$$

k) embedding the received message N-bit string of the initial block, which is termed the 0-th block, into the x-coordinate of the received message elliptic point $(x_{rm_0},\sqrt{\alpha_{rm_0}}y_{rm_0})$ using the non-iterative embedding method described below;

l) if the message point of the 0-th block is on the elliptic curve; i.e., $\alpha_{rm_0}=1$, the MAC points are computed using $(x_{rc_0}, y_{rc_0})=(x_{rm_0},y_{rm_0})+(x_{S_0},y_{S_0})$ and $$(x_{rTc_0}, \sqrt{\alpha}\, y_{rTc_0}) = (x_{TS_0}, \sqrt{\alpha}\, y_{TS_0}),$$

otherwise they are computed using $$(x_{rTc_0}, \sqrt{\alpha}\, y_{rTc_0}) = (x_{rm_0}, \sqrt{\alpha}\, y_{rm_0}) + (x_{TS_0}, \sqrt{\alpha}\, y_{TS_0})$$

and $(x_{rc_0},y_{rc_0})=(x_{S_0},y_{S_0})$.

Starting with i=1, the following steps m) through p) are repeated until i>u:

m) embedding the message N-bit string of the i-th block into the x-coordinate of the elliptic message point $(x_{rm_i},\sqrt{\alpha_{rm_i}}y_{rm_i})$ using the non-iterative embedding method described below;

n) if the message point of the i-th block is on the elliptic curve; i.e., $\alpha_{rm_i}=1$, then the MAC points are computed using $(x_{rc_i},y_{rc_i})=(x_{rm_i},y_{rm_i})+(x_{S_i},y_{S_i})$ and $$(x_{rTc_i}, \sqrt{\alpha}\, y_{rTc_i}) = (x_{rTc_{i-1}}, \sqrt{\alpha}\, y_{rTc_{i-1}}),$$

otherwise they are computed using $$(x_{rTc_i}, \sqrt{\alpha}\, y_{rTc_i}) = (x_{rm_i}, \sqrt{\alpha}\, y_{rm_i}) + (x_{rTc_{i-1}}, \sqrt{\alpha}\, y_{rTc_{i-1}})$$

and $(x_{rc_i},y_{rc_i})=(x_{rc_{i-1}},y_{rc_{i-1}})$;

o) the appropriate bits of the x-coordinate $x_{rc}$ and the sign bit of the y-coordinate $y_{rc}$ of the MAC point $(x_{rc_u},y_{rc_u})$, and the appropriate bits of the x-coordinates $x_{rTc}$ and the sign bit of the y-coordinate $y_{rTc}$ of the MAC point $$(x_{rTc_u}, \sqrt{\alpha}\, y_{rTc_u})$$

are concatenated together to form the MAC of the received message; and p) if the received MAC is equal to the MAC of the received message generated at the receiving correspondent, then the received message is authenticated.

In an alternative embodiment, the following steps are performed:

a) coefficients a,b∈F are specified, along with a base point on an elliptic curve, $(x_B,y_B)\in EC$, and a base point on its twist, $$(x_{TB}, \sqrt{\alpha}\, y_{TB}) \in TEC.$$

Both the sending and receiving correspondents agree on a random number k, which will be the shared secret key for communication, and $(x_B,y_B)$ and $$(x_{TB}, \sqrt{\alpha}\, y_{TB});$$

The sending correspondent then performs the following steps:

b) embedding the bit string of the shared secret key into the x-coordinate of the key elliptic point $(x_k,\sqrt{\alpha_k}y_k)$ using the non-iterative embedding method to be described below;

c) if $(x_k,\sqrt{\alpha_k}y_k)$ is on the elliptic curve; i.e., $\alpha_k=1$, then compute the scalar multiplication $$(x_{TS_0}, \sqrt{\alpha}\, y_{TS_0}) = k(x_{TB}, \sqrt{\alpha}\, y_{TB}),$$

and set $(x_{S_0},y_{S_0})=(x_k,y_k)$, and if $\alpha_k=\overline{\alpha}$, then compute the scalar multiplication $(x_{S_0},y_{S_0})=k(x_B,y_B)$ and set $$(x_{TS_0}, \sqrt{\alpha}\, y_{TS_0}) = (x_k, \sqrt{\alpha}\, y_k);$$

d) embedding the message N-bit string of the initial block, which is termed the 0-th block, into the x-coordinate of the elliptic message point $(x_{m_0},\sqrt{\alpha_{m_0}}y_{m_0})$ using the non-iterative embedding method to be described below;

e) if the message point of the 0-th block is on the elliptic curve; i.e. $\alpha_{m_0}=1$, the MAC points are computed using $(x_{c_0},y_{c_0})=(x_{m_0},y_{m_0})+(x_{S_0},y_{S_0})$ and $$(x_{Tc_0}, \sqrt{\alpha}\, y_{Tc_0}) = (x_{TS_0}, \sqrt{\alpha}\, y_{TS_0}),$$

otherwise they are computed using $$(x_{Tc_0}, \sqrt{\alpha}\, y_{Tc_0}) = (x_{m_0}, \sqrt{\alpha}\, y_{m_0}) + (x_{TS_0}, \sqrt{\alpha}\, y_{TS_0})$$

and $(x_{c_0},y_{c_0})=(x_{S_0},y_{S_0})$.

Starting with i=1, the following steps f) through h) are repeated until i>u:

f) embedding the message N-bit string of the i-th block into the x-coordinate of the elliptic message point $(x_{m_i},\sqrt{\alpha_{m_i}}y_{m_i})$ using the non-iterative embedding method described below;

g) doubling the points $(x_{S_i},y_{S_i})$ and $(x_{TS_i},y_{TS_i})$, such that $(x_{S_i},y_{S_i})=2(x_{S_{i-1}},y_{S_{i-1}})$ and $$(x_{TS_i}, y_{TS_i}) = 2(x_{TS_{i-1}}, \sqrt{\alpha}\, y_{TS_{i-1}});$$

h) if the message point of the i-th block is on the elliptic curve; i.e., $\alpha_{m_i}=1$, the MAC points are computed using $(x_{c_i},y_{c_i})=(x_{m_i},y_{m_i})+(x_{m_{i-1}},y_{m_{i-1}})+(x_{S_i},y_{S_i})$ and $$(x_{Tc_i}, \sqrt{\alpha}\, y_{Tc_i}) = (x_{Tc_{i-1}}, \sqrt{\alpha}\, y_{Tc_{i-1}}).$$

Otherwise they are computed using the equations $$(x_{Tc_i}, \sqrt{\alpha}\, y_{Tc_i}) = (x_{m_i}, \sqrt{\alpha}\, y_{m_i}) + (x_{m_{i-1}}, \sqrt{\alpha}\, y_{m_{i-1}}) + (x_{TS_i}, \sqrt{\alpha}\, y_{TS_i})$$

and $(x_{c_i}, y_{c_i}) = (x_{c_{i-1}}, y_{c_{i-1}})$;

i) the appropriate bits of the x-coordinate $x_c$ and the sign bit of the y-coordinate $y_c$ of the MAC point $(x_{c_u}, y_{c_u})$, and the appropriate bits of the x-coordinate $x_{Tc}$ and the sign bit of the y-coordinate $y_{Tc}$ of the MAC point $$(x_{Tc_u}, \sqrt{\alpha}\, y_{Tc_u})$$

are concatenated together to form the MAC, which is appended to the message to be sent together with, if necessary, any additional information needed to help authenticate the message bit string at the receiving correspondent without compromising security and sent to the receiving correspondent.

At the receiving correspondent, the following steps are performed:

j) embedding the bit string of the secret key into the x-coordinate of the key elliptic point $(x_k, \sqrt{\alpha_k}\, y_k)$ using the non-iterative embedding method described below;

k) if $(x_k, \sqrt{\alpha_k}\, y_k)$ is on the elliptic curve; i.e., $\alpha_k = 1$, then compute the scalar multiplication $$(x_{TS_0}, \sqrt{\alpha}\, y_{TS_0}) = k(x_{TB}, \sqrt{\alpha}\, y_{TB})$$

and set $(x_{S_0}, y_{S_0}) = (x_k, y_k)$, otherwise if $\alpha_k = \bar{\alpha}$, then compute the scalar multiplication $(x_{S_0}, y_{S_0}) = k(x_B, y_B)$ and set $$(x_{TS_0}, \sqrt{\alpha}\, y_{TS_0}) = (x_k, \sqrt{\alpha}\, y_k);$$

l) embedding the received message N-bit string of the initial block, which is termed the 0-th block, into the x-coordinate of the received message elliptic point $(x_{rm_0}, \sqrt{\alpha_{rm_0}}\, y_{rm_0})$ using the non-iterative embedding method described below;

m) if the message point of the 0-th block is on the elliptic curve; i.e., $\alpha_{rm_0} = 1$, the MAC points are computed using $(x_{rc_0}, y_{rc_0}) = (x_{rm_0}, y_{rm_0}) + (x_{S_0}, y_{S_0})$ and $$(x_{rTc_0}, \sqrt{\alpha}\, y_{rTc_0}) = (x_{TS_0}, \sqrt{\alpha}\, y_{TS_0}),$$

otherwise they are computed using $$(x_{rTc_0}, \sqrt{\alpha}\, y_{rTc_0}) = (x_{rm_0}, \sqrt{\alpha}\, y_{rm_0}) + (x_{TS_0}, \sqrt{\alpha}\, y_{TS_0})$$

and $(x_{rc_0}, y_{rc_0}) = (x_{S_0}, y_{S_0})$.

Starting with i=1, the following steps n) through p) are repeated until i>u:

n) embedding the message N-bit string of the i-th block into the x-coordinate of the elliptic message point $(x_{rm_i}, \sqrt{\alpha_{rm_i}}\, y_{rm_i})$ using the non-iterative embedding method described below;

o) doubling the points $(x_{S_i}, y_{S_i})$ and $(x_{TS_i}, y_{TS_i})$, such that $(x_{S_i}, y_{S_i}) = 2(x_{S_{i-1}}, y_{S_{i-1}})$ and $$(x_{TS_i}, y_{TS_i}) = 2(x_{TS_{i-1}}, \sqrt{\alpha}\, y_{TS_{i-1}});$$

p) if the message point of the i-th block is on the elliptic curve; i.e., $\alpha_{rm_i} = 1$, then the MAC points are computed using $(x_{rc_i}, y_{rc_i}) = (x_{rm_i}, y_{rm_i}) + (x_{rm_{i-1}}, y_{rm_{i-1}}) + (x_{S_i}, y_{S_i})$ and $$(x_{rTc_i}, \sqrt{\alpha}\, y_{rTc_i}) = (x_{rTc_{i-1}}, \sqrt{\alpha}\, y_{rTc_{i-1}}).$$

Otherwise, they are computed using the equations $$(x_{rTc_i}, \sqrt{\alpha}\, y_{rTc_i}) = (x_{rm_i}, \sqrt{\alpha}\, y_{rm_i}) + (x_{rm_{i-1}}, \sqrt{\alpha}\, y_{rm_{i-1}}) + (x_{TS_i}, \sqrt{\alpha}\, y_{TS_i})$$

and $(x_{rc_i}, y_{rc_i}) = (x_{rc_{i-1}}, y_{rc_{i-1}})$;

q) the appropriate bits of the x-coordinate $x_{rc}$ and the sign bit of the y-coordinate $y_{rc}$ of the MAC point $(x_{rc_u}, y_{rc_u})$, and the appropriate bits of the x-coordinates $x_{rTc}$ and the sign bit of the y-coordinate $y_{rTc}$ of the MAC point $$(x_{rTc_u}, \sqrt{\alpha}\, y_{rTc_u})$$

are concatenated together to form the MAC of the received message; and r) if the received MAC is equal to the MAC of the received message generated at the receiving correspondent, then the received message is authenticated.

In a further alternative embodiment of the method authentication code generation method, the following steps are implemented:

a) $S_{m_i}$ is assigned to represent the N-bit string of the i-th message block, and the coefficients a,b∈F are specified, along with a base point on an elliptic curve, $(x_B, y_B) \in EC$, and a base point on its twist, $$(x_{TB}, \sqrt{\alpha}\, y_{TB}) \in TEC.$$

Both the sending and receiving correspondents agree on a random number k, which will be the shared secret key for communication, and $(x_B, y_B)$ and $$(x_{TB}, \sqrt{\alpha}\, y_{TB}),$$

along with an initial vector $S_{m_{-1}}$;

the sending correspondent then performs the following steps:

b) embedding the bit string of the shared secret key into the x-coordinate of the key elliptic point $(x_k, \sqrt{\alpha_k}\, y_k)$ using the non-iterative embedding method to be described below;

c) if $(x_k,\sqrt{\alpha_k}y_k)$ is on the elliptic curve; i.e., $\alpha_k=1$, then compute the scalar multiplication $$(x_{TS_0}, \sqrt{\alpha}\, y_{TS_0}) = k(x_{TB}, \sqrt{\alpha}\, y_{TB}),$$

and set $(x_{S_0},y_{S_0})=(x_k,y_k)$, and if $\alpha_k=\overline{\alpha}$, then compute the scalar multiplication $(x_{S_0},y_{S_0})=k(x_B,y_B)$ and set $$(x_{TS_0}, \sqrt{\alpha}\, y_{TS_0}) = (x_k, \sqrt{\alpha}\, y_k);$$

d) computing the N-bit string $S'_{m_0}$ as $S'_{m_0}=S_{m_0}\oplus S_{m_{-1}}$ and then embedding the message N-bit string $S'_{m_0}$ of the initial block, which is termed the 0-th block, into the x-coordinate of the elliptic message point $(x_{m_0},\sqrt{\alpha_{m_0}}y_{m_0})$ using the non-iterative embedding method to be described below;

e) if the message point of the 0-th block is on the elliptic curve; i.e. $\alpha_{m_0}=1$, the MAC points are computed using $(x_{c_0},y_{c_0})=(x_{m_0},y_{m_0})+(x_{S_0},y_{S_0})$ and $$(x_{T_{c_0}}, \sqrt{\alpha}\, y_{T_{c_0}}) = (x_{TS_0}, \sqrt{\alpha}\, y_{TS_0}),$$

otherwise they are computed using $$(x_{T_{c_0}}, \sqrt{\alpha}\, y_{T_{c_0}}) = (x_{m_0}, \sqrt{\alpha}\, y_{m_0}) + (x_{TS_0}, \sqrt{\alpha}\, y_{TS_0})$$

and $(x_{c_0},y_{c_0})=(x_{S_0},y_{S_0})$.

Starting with i=1, the following steps f) through h) are repeated until i>u:

f) computing the N-bit string $S'_{m_i}$ as $S'_{m_i}=S_{m_i}\oplus S_{m_{i-1}}$ and embedding the message N-bit string of the i-th block into the x-coordinate of the elliptic message point $(x_{m_i},\sqrt{\alpha_{m_i}}y_{m_i})$ using the non-iterative embedding method described below;

g) doubling the points $(x_{S_i},y_{S_i})$ and $(x_{TS_i},y_{TS_i})$ as $(x_{S_i},y_{S_i})=2(x_{S_{i-1}},y_{S_{i-1}})$ and $$(x_{TS_i}, y_{TS_i}) = 2(x_{TS_{i-1}}, \sqrt{\alpha}\, y_{TS_{i-1}});$$

h) if the message point of the i-th block is on the elliptic curve; i.e., $\alpha_{m_i}=1$, the MAC points are computed using $(x_{c_i},y_{c_i})=(x_{m_i},y_{m_i})+(x_{m_{i-1}},y_{m_{i-1}})+(x_{S_i},y_{S_i})$ and $$(x_{T_{c_i}}, \sqrt{\alpha}\, y_{T_{c_i}}) = (x_{T_{c_{i-1}}}, \sqrt{\alpha}\, y_{T_{c_{i-1}}}),$$

otherwise they are computed using $$(x_{T_{c_i}}, \sqrt{\alpha}\, y_{T_{c_i}}) = (x_{m_i}, \sqrt{\alpha}\, y_{m_i}) + (x_{m_{i-1}}, \sqrt{\alpha}\, y_{m_{i-1}}) + (x_{TS_i}, \sqrt{\alpha}\, y_{TS_i})$$

and $(x_{c_i},y_{c_i})=(x_{c_{i-1}},y_{c_{i-1}})$;

i) the appropriate bits of the x-coordinate $x_c$ and the sign bit of the y-coordinate $y_c$ of the MAC point $(x_{c_u},y_{c_u})$, and the appropriate bits of the x-coordinate $x_{Tc}$ and the sign bit of the y-coordinate $y_{Tc}$ of the MAC point $$(x_{T_{c_u}}, \sqrt{\alpha}\, y_{T_{c_u}})$$

are concatenated together to form the MAC, which is appended to the message to be sent together with, if necessary, any additional information needed to help authenticate the message bit string at the receiving correspondent without compromising security and sent to the receiving correspondent.

At the receiving correspondent, the following steps are performed:

j) embedding the bit string of the secret key into the x-coordinate of the key elliptic point $(x_k,\sqrt{\alpha_k}y_k)$ using the non-iterative embedding method described below;

k) if $(x_k,\sqrt{\alpha_k}y_k)$ is on the elliptic curve; i.e., $\alpha_k=1$, then compute the scalar multiplication $$(x_{TS_0}, \sqrt{\alpha}\, y_{TS_0}) = k(x_{TB}, \sqrt{\alpha}\, y_{TB})$$

and set $(x_{S_0},y_{S_0})=(x_k,y_k)$ otherwise if $\alpha_k=\overline{\alpha}$, then compute the scalar multiplication $(x_{S_0},y_{S_0})=k(x_B,y_B)$ and set $$(x_{TS_0}, \sqrt{\alpha}\, y_{TS_0}) = (x_k, \sqrt{\alpha}\, y_k);$$

l) computing the N-bit string $S'_{rm_0}$ as $S'_{rm_0}=S_{rm_0}\oplus S_{rm_{-1}}$, and embedding the received message N-bit string of the initial block, which is termed the 0-th block, into the x-coordinate of the received message elliptic point $(x_{rm_0},\sqrt{\alpha_{rm_0}}y_{rm_0})$ using the non-iterative embedding method described below;

m) if the message point of the 0-th block is on the elliptic curve; i.e., $\alpha_{rm_0}=1$, the MAC points are computed using $(x_{rc_0},y_{rc_0})=(x_{rm_0},y_{rm_0})+(x_{S_0},y_{S_0})$ and $$(x_{rT_{c_0}}, \sqrt{\alpha}\, y_{rT_{c_0}}) = (x_{TS_0}, \sqrt{\alpha}\, y_{TS_0}),$$

otherwise they are computed using $$(x_{rT_{c_0}}, \sqrt{\alpha}\, y_{rT_{c_0}}) = (x_{rm_0}, \sqrt{\alpha}\, y_{rm_0}) + (x_{TS_0}, \sqrt{\alpha}\, y_{TS_0})$$

and $(x_{rc_0},y_{rc_0})=(x_{S_0},y_{S_0})$.

Starting with i=1, the following steps n) through p) are repeated until i>u:

n) computing the N-bit string $S'_{rm_i}$ as $S'_{rm_i}=S_{rm_i}\oplus S_{rm_{i-1}}$ and embedding the message N-bit string of the i-th block into the x-coordinate of the elliptic message point $(x_{rm_i},\sqrt{\alpha_{rm_i}}y_{rm_i})$ using the non-iterative embedding method described below;

o) doubling the points $(x_{S_i},y_{S_i})$ and $(x_{TS_i},y_{TS_i})$ as $(x_{S_i},y_{S_i})=2(x_{S_{i-1}},y_{S_{i-1}})$ and $$(x_{TS_i}, y_{TS_i}) = 2(x_{TS_{i-1}}, \sqrt{\alpha}\, y_{TS_{i-1}});$$

p) if the message point of the i-th block is on the elliptic curve; i.e., $\alpha_{rm_i}=1$, then the MAC points are computed using $(x_{rc_i},y_{rc_i})=(x_{rm_i},y_{rm_i})+(x_{rm_{i-1}},y_{rm_{i-1}})+(x_{S_i},y_{S_i})$ and $$(x_{rT_{c_i}}, \sqrt{\alpha}\, y_{rT_{c_i}}) = (x_{rT_{c_{i-1}}}, \sqrt{\alpha}\, y_{rT_{c_{i-1}}}).$$

Otherwise, they are computed using the equations $$(x_{rT_{c_i}}, \sqrt{\alpha}\, y_{rT_{c_i}}) = (x_{rm_i}, \sqrt{\alpha}\, y_{rm_i}) + (x_{rm_{i-1}}, \sqrt{\alpha}\, y_{rm_{i-1}}) + (x_{TS_i}, \sqrt{\alpha}\, y_{TS_i})$$

and $(x_{rc_i},y_{rc_i})=(x_{rc_{i-1}},y_{rc_{i-1}})$;

q) the appropriate bits of the x-coordinate $x_{rc}$ and the sign bit of the y-coordinate $y_{rc}$ of the MAC point $(x_{rc_u}, y_{rc_u})$, and the appropriate bits of the x-coordinates $x_{rTc}$ and the sign bit of the y-coordinate $y_{rTc}$ of the MAC point $$(x_{rTc_u}, \sqrt{\overline{\alpha}}\, y_{rTc_u})$$

are concatenated together to form the MAC of the received message; and r) if the received MAC is equal to the MAC of the received message generated at the receiving correspondent, then the received message is authenticated.

The above methods can also be applied to find the MAC for bit streams of media data such as text, audio, video, or a multimedia data. Further, the above MAC methods can be applied to the verification of media data. For efficiency of computation, the above methods are used with a pre-processing stage that is used to compress the media data prior to the application of the MAC method. Either a lossless compression method or a lossy compression method can be used to compress the media data in the pre-processing stage. The bit string of the compressed message at the output of the pre-processing stage is then used as the input to the MAC generation methods.

As noted above, the methods include data embedding. In order to embed a message bit string into a point $(x, \sqrt{\alpha}y)$ which satisfies either an elliptic curve equation $y^2 = x^3 + ax + b$ or its twist, $\overline{\alpha}y^2 = x^3 + ax + b$, the message bit string is first divided into N-bit strings and the $i^{th}$ block is denoted as $m_i$. Following this, the value of the bit string of $m_i$ is assigned to $x_{m_i}$, and the values of $x_{m_i}$ are substituted and the value of $t_{m_i}$ is computed using $t_{m_i} = x_{m_i}^3 + ax_{m_i} + b$.

If $t_{m_i}$ is quadratic residue, then $y_{m_i} = \sqrt{t_{m_i}}$ and the point is given as $(x_{m_i}, y_{m_i})$. However, if $t_{m_i}$ is non-quadratic residue, then $$y_{m_i} = \sqrt{\frac{t_{m_i}}{\alpha}}$$

and the point is given as $$(x_{m_i}, \sqrt{\overline{\alpha}}\, y_{m_i}).$$

The message point is then denoted as $(x_{m_i}, \sqrt{\alpha_{m_i}}\, y_{m_i})$, where the point is on the elliptic curve if $\alpha_{m_i} = 1$, and the point is on the twist if $\alpha_{m_i} = \overline{\alpha}$.

The Legendre Symbol is used to test whether an element of F(p) has a square root or not, i.e., whether an element is quadratic residue or not. The Legendre Symbol and test are as follows. Given an element of a finite field F(p), such as d, the Legendre symbol is defined as $$\left(\frac{d}{p}\right).$$

In order to test whether d is quadratic residue or not, the Legendre symbol, $$\left(\frac{d}{p}\right),$$

is computed such that $$\left(\frac{d}{p}\right) = \begin{cases} +1 & \text{if } x \text{ is quadratic residue} \\ 0 & \text{if } x \equiv 0 \bmod F(p) \\ -1 & \text{otherwise.} \end{cases}$$

In the above, the MAC generation methods use the scalar multiplication $k_m(x_{Pu}, y_{Pu})$. It should be noted that, in order to find a collision means, that there are two message bits strings m and m' such that their integer values $k_m$ and $k_{m'}$ will lead to $k_m k(x_B, y_B) \equiv k_{m'} k(x_B, y_B)$. This collision implies that integers can be found such that $k_m k - k_{m'} k = l * \#EC$, where #EC is the order of the group (EC, +). This is equivalent to solving the elliptic curve discrete logarithm problem. This also applies to finding a collision for the points on the twist of an elliptic curve, $$k_m k(x_{TB}, \sqrt{\overline{\alpha}}\, y_{TB}) = k_{m'} k(x_{TB}, \sqrt{\overline{\alpha}}\, y_{TB}).$$

Thus, security of the MACs depends on the security of the underlying elliptic curve cryptography. The security of elliptic curve cryptosystems is assessed by both the effect on the solution of the elliptic curve discrete logarithmic problem (ECDLP) and power analysis attacks.

It is well known that the elliptic curve discrete logarithm problem (ECDLP) is apparently intractable for non-singular elliptic curves. The ECDLP problem can be stated as follows: given an elliptic curve defined over F that needs N-bits for the representation of its elements, an elliptic curve point $(x_P, y_P) \in EC$, defined in affine coordinates, and a point $(x_Q, y_Q) \in EC$, defined in affine coordinates, determine the integer k, $0 \leq k \leq \#F$, such that $(x_Q, y_Q) = k(x_P, y_P)$, provided that such an integer exists. In the below, it is assumed that such an integer exists.

The most well known attack used against the ECDLP is the Pollard ρ-method, which has a complexity of $O(\sqrt{\pi K}/2)$, where K is the order of the underlying group, and the complexity is measured in terms of an elliptic curve point addition.

Since the underlying cryptographic problems used in the above methods is the discrete logarithm problem, which is a known difficult mathematical problem, it is expected that the security of the above methods are more secure than prior art ciphers which are not based on such a mathematically hard problem.

It should be understood that the calculations may be performed by any suitable computer system, such as that diagrammatically shown in the sole drawing FIGURE. Data is entered into system 100 via any suitable type of user interface 116, and may be stored in memory 112, which may be any suitable type of computer readable and programmable memory and is preferably a non-transitory, computer readable storage medium. Calculations are performed by processor 114, which may be any suitable type of computer processor and may be displayed to the user on display 118, which may be any suitable type of computer display.

Processor 114 may be associated with, or incorporated into, any suitable type of computing device, for example, a personal computer or a programmable logic controller. The display 118, the processor 114, the memory 112 and any associated computer readable recording media are in communication with one another by any suitable type of data bus, as is well known in the art.

Examples of computer-readable recording media include a magnetic recording apparatus, an optical disk, a magneto-optical disk, and/or a semiconductor memory (for example, RAM, ROM, etc.). Examples of magnetic recording apparatus that may be used in addition to memory 112, or in place of memory 112, include a hard disk device (HDD), a flexible disk (FD), and a magnetic tape (MT). Examples of the optical disk include a DVD (Digital Versatile Disc), a DVD-RAM, a CD-ROM (Compact Disc-Read Only Memory), and a CD-R (Recordable)/RW.

It is to be understood that the present invention is not limited to the embodiments described above, but encompasses any and all embodiments within the scope of the following claims.

We claim:

1. A computer software product that includes a non-transitory storage medium readable by a processor, the non-transitory storage medium having stored thereon a set of instructions for generating an elliptic-curve based message authentication code, the instructions comprising:

(a) a first set of instructions which, when loaded into main memory and executed by the processor, causes the processor to embed a bit string of a shared secret key into an x-coordinate of a key elliptic point $(x_k, \sqrt{\alpha_k} y_k)$ using a non-iterative embedding method at a sending correspondent, wherein the sending correspondent and a receiving correspondent agree upon a set of coefficients a and b such that $a, b \in F$, wherein F represents a finite field wherein the elements of F can be represented using (N+1) bits, wherein N is a natural number, and further agreeing upon a base point $(x_B, y_B) \in EC$, wherein EC represents an elliptic curve defined over F which satisfies the equation $y^2 = x^3 + ax + b$, and a base point on its twist $$(x_{TB}, \sqrt{\overline{\alpha}}\, y_{TB}) \in TEC,$$

wherein TEC represents the twist of the elliptic curve EC defined over F that satisfies the equation $\overline{\alpha} y_2 = x^3 + ax + b$, wherein $\overline{\alpha} \in F$ is a non-quadratic residue element of the finite field F, and further, the sending correspondent and the receiving correspondent agree on a random number k, the random number k being the shared secret key for communication;

(b) a second set of instructions which, when loaded into main memory and executed by the processor, causes the processor to compute a scalar multiplication $$(x_{TS_0}, \sqrt{\overline{\alpha}}\, y_{TS_0}) = k(x_{TB}, \sqrt{\overline{\alpha}}\, y_{TB})$$

and set $(x_{S_0}, y_{S_0}) = (x_k, y_k)$ if $(x_k, \sqrt{\alpha_k} y_k)$ is on the elliptic curve, and if $\alpha_k = \overline{\alpha}$, then performing a scalar multiplication $(x_{S_0}, y_{S_0}) = k(x_B, y_B)$ and setting $$(x_{TS_0}, \sqrt{\overline{\alpha}}\, y_{TS_0}) = (x_k, \sqrt{\overline{\alpha}}\, y_k),$$

wherein $(x_{S_0}, y_{S_0})$ is a 0-th value of shared secret point $(x_S, y_S)$ and $(x_{TS_0}, y_{TS_0})$ is a 0-th value of a twist of the shared secret point $(x_{TS}, y_{TS})$ at the sending correspondent;

(c) a third set of instructions which, when loaded into main memory and executed by the processor, causes the processor to embed the message N-bit string of the 0-th block into the x-coordinate of an elliptic message point $(x_{m_0}, \sqrt{\alpha_{m_0}} y_{m_0})$ using the non-iterative embedding method;

(d) a fourth set of instructions which, when loaded into main memory and executed by the processor, causes the processor to compute a set of message authentication code points $(x_{c_0}, y_{c_0})$ and their corresponding twists $(x_{Tc_0}, y_{Tc_0})$ if the message point of the 0-th block is on the elliptic curve using $(x_{c_0}, y_{c_0}) = (x_{m_0}, y_{m_0}) + (x_{S_0}, y_{S_0})$ and $$(x_{Tc_0}, \sqrt{\overline{\alpha}}\, y_{Tc_0}) = (x_{TS_0}, \sqrt{\overline{\alpha}}\, y_{TS_0}),$$

otherwise they are computed using $$(x_{Tc_0}, \sqrt{\overline{\alpha}}\, y_{Tc_0}) = (x_{m_0}, \sqrt{\overline{\alpha}}\, y_{m_0}) + (x_{TS_0}, \sqrt{\overline{\alpha}}\, y_{TS_0})$$

and $(x_{c_0}, y_{c_0}) = (x_{S_0}, y_{S_0})$ at the sending correspondent;

(e) a fifth set of instructions which, when loaded into main memory and executed by the processor, causes the processor to establish an integer i denoting the $i^{th}$ message data block and having an initial value of i=1, then the following sixth through eighth sets of instructions are repeated until all the message data blocks are processed, and incrementing i at each step:

(f) a sixth set of instructions which, when loaded into main memory and executed by the processor, causes the processor to embed the message N-bit string of the i-th block into the x-coordinate of the elliptic message point $(x_{m_i}, \sqrt{\alpha_{m_i}} Y_{m_i})$ using the non-iterative embedding method at the sending correspondent;

(g) a seventh set of instructions which, when loaded into main memory and executed by the processor, causes the processor to compute the i-th block message authentication code points as $(x_{c_i}, y_{c_i}) = (x_{m_i}, y_{m_i}) + (x_{c_{i-1}}, y_{c_{i-1}})$ and their twists as $$(x_{Tc_i}, \sqrt{\overline{\alpha}}\, y_{Tc_i}) = (x_{Tc_{i-1}}, \sqrt{\overline{\alpha}}\, y_{Tc_{i-1}})$$

if the message point of the i-th block is on the elliptic curve, otherwise they are computed using $$(x_{Tc_i}, \sqrt{\overline{\alpha}}\, y_{Tc_i}) = (x_{m_i}, \sqrt{\overline{\alpha}}\, y_{m_i}) + (x_{Tc_{i-1}}, \sqrt{\overline{\alpha}}\, y_{Tc_{i-1}})$$

and $(x_{c_i}, y_{c_i}) = (x_{c_{i-1}}, y_{c_{i-1}})$ at the sending correspondent;

(h) an eighth set of instructions which, when loaded into main memory and executed by the processor, causes the processor to concatenate together appropriate bits of the x-coordinate $x_{c_i}$ and a sign bit of the y-coordinate $y_{c_i}$ of the message authentication code point $(x_{c_u}, y_{c_u})$, and the appropriate bits of the x-coordinate $x_{Tc_i}$ and the sign bit of the y-coordinate $y_{Tc_i}$ of the twist of the MAC point $$(x_{Tc_u}, \sqrt{\overline{\alpha}}\, y_{Tc_u})$$

to form the message authentication code, which is appended to the message to be sent at the sending correspondent;

(i) a ninth set of instructions which, when loaded into main memory and executed by the processor, causes the processor to embed the bit string of the secret key into the x-coordinate of the key elliptic point $(x_k, \sqrt{\alpha_k} y_k)$ using the non-iterative embedding method at the receiving correspondent;

(j) a tenth set of instructions which, when loaded into main memory and executed by the processor, causes the processor to perform the scalar multiplication $$(x_{TS_0}, \sqrt{\alpha}\, y_{TS_0}) = k(x_{TB}, \sqrt{\alpha}\, y_{TB})$$

and set $(x_{S_0}, y_{S_0}) = (x_k, y_k)$ if $(x_k, \sqrt{\alpha_k} y_k)$ is on the elliptic curve, otherwise if $\alpha_k = \alpha_0$, then performing the scalar multiplication $(x_{S_0}, y_{S_0}) = k(x_B, y_B)$ and setting $$(x_{TS_0}, \sqrt{\alpha}\, y_{TS_0}) = (x_k, \sqrt{\alpha}\, y_k)$$

at the receiving correspondent;

(k) an eleventh set of instructions which, when loaded into main memory and executed by the processor, causes the processor to embed a received message N-bit string of the 0-th block into the x-coordinate of a received message elliptic point $(x_{rm_0}, \sqrt{\alpha_{rm_0}} y_{rm_0})$ using the non-iterative embedding method;

(l) a twelfth set of instructions which, when loaded into main memory and executed by the processor, causes the processor to compute received message authentication code points $(x_{rc_0}, y_{rd_0})$ and their corresponding twists $(x_{rTc_0}, y_{rTc_0})$ if the message point of the 0-th block is on the elliptic curve using $(x_{rc_0}, y_{rc_0}) = (x_{rm_0}, y_{rm_0}) + (x_{S_0}, y_{S_0})$ and $$(x_{rTc_0}, \sqrt{\alpha}\, y_{rTc_0}) = (x_{TS_0}, \sqrt{\alpha}\, y_{TS_0}),$$

otherwise they are computed using $$(x_{rTc_0}, \sqrt{\alpha}\, y_{rTc_0}) = (x_{rm_0}, \sqrt{\alpha}\, y_{rm_0}) + (x_{TS_0}, \sqrt{\alpha}\, y_{TS_0})$$

and $(x_{rc_0}, y_{rc_0}) = (x_{S_0}, y_{S_0})$ at the receiving correspondent;

(m) a thirteenth set of instructions which, when loaded into main memory and executed by the processor, causes the processor to initialize i as i=1, then the following fourteenth through sixteenth sets of instructions are repeated until all received message data blocks are processed, and incrementing i at each step:

(n) a fourteenth set of instructions which, when loaded into main memory and executed by the processor, causes the processor to embed the message N-bit string of the i-th block into the x-coordinate of the received elliptic message point $(x_{rm_i}, \sqrt{\alpha_{rm_i}} y_{rm_i})$ using the non-iterative embedding method at the receiving correspondent;

(o) a fifteenth set of instructions which, when loaded into main memory and executed by the processor, causes the processor to compute the i-th block received message authentication code points if the message point of the i-th block is on the elliptic curve using $(x_{rc_i}, y_{rc_i}) = (x_{rm_i}, y_{rm_i}) + (x_{S_i}, y_{S_i})$ and $$(x_{rTc_i}, \sqrt{\alpha}\, y_{rTc_i}) = (x_{rTc_{i-1}}, \sqrt{\alpha}\, y_{rTc_{i-1}}),$$

otherwise they are computed using $$(x_{rTc_i}, \sqrt{\alpha}\, y_{rTc_i}) = (x_{rm_i}, \sqrt{\alpha}\, y_{rm_i}) + (x_{rTc_{i-1}}, \sqrt{\alpha}\, y_{rTc_{i-1}})$$

and $(x_{rc_i}, y_{rc_i}) = (x_{rc_{i-1}}, y_{rc_{i-1}})$ at the receiving correspondent;

(p) a sixteenth set of instructions which, when loaded into main memory and executed by the processor, causes the processor to concatenate together appropriate bits of the received x-coordinate $x_{rc_i}$ and the sign bit of the y-coordinate $y_{rc_i}$ of the MAC point $(x_{rc_u}, y_{rc_u})$, and the appropriate bits of the received x-coordinates $x_{rTc}$, and the sign bit of the received y-coordinate $y_{rTc_i}$ of the message authentication code point $$(x_{rTc_u}, \sqrt{\alpha}\, y_{rTc_u})$$

to form the message authentication code of the received message at the receiving correspondent; and (q) a seventeenth set of instructions which, when loaded into main memory and executed by the processor, causes the processor to authenticate the received message if the received message authentication code is equal to the message authentication code of the received message generated at the receiving correspondent.

2. The computer software product as recited in claim 1, wherein the non-iterative embedding method comprises:

(r) an eighteenth set of instructions which, when loaded into main memory and executed by the processor, causes the processor to divide the message bit string into N-bit strings and establishing $m_i$ as the $i^{th}$ block;

(s) a seventeenth set of instructions which, when loaded into main memory and executed by the processor, causes the processor to assign the value of the bit string of $m_i$ to $x_{m_i}$;

(t) an eighteenth set of instructions which, when loaded into main memory and executed by the processor, causes the processor to substitute the values of $x_{m_i}$ and computing a value $t_{m_i}$ as $t_{m_i} = x_{m_i}^3 + ax_{m_i} + b$, wherein if $t_{m_i}$ is quadratic residue such that $y_{m_i} = \sqrt{t_{m_i}}$ then a temporary message point $(x_{m_i}, y_{m_i})$ is established, and if $t_{m_i}$ is non-quadratic residue such that $$y_{m_i} = \sqrt{\frac{t_{m_i}}{\alpha}}$$

then the temporary message point is established as $$(x_{m_i}, \sqrt{\alpha}\, y_{m_i}),$$

wherein $$\sqrt{\alpha} \neq 0;$$

and (u) a nineteenth set of instructions which, when loaded into main memory and executed by the processor, causes the processor to establish a message point $(x_{m_i},\sqrt{\alpha_{m_i}}y_{m_i})$, wherein the message point is on the elliptic curve if $\alpha_{m_i}=1$, and the message point is on the twist of the elliptic curve if $\alpha_{m_i}=\overline{\alpha}$.

3. A computer software product that includes a non-transitory storage medium readable by a processor, the non-transitory storage medium having stored thereon a set of instructions for generating an elliptic-curve based message authentication code, the instructions comprising:

(a) a first set of instructions which, when loaded into main memory and executed by the processor, causes the processor to embed a bit string of a shared secret key into an x-coordinate of a key elliptic point $(x_k,\sqrt{\alpha_k}y_k)$ using a non-iterative embedding method at a sending correspondent, wherein the sending correspondent and a receiving correspondent agree upon a set of coefficients a and b such that a,b∈F , wherein F represents a finite field wherein the elements of F can be represented using (N+1) bits, wherein N is a natural number, and further agreeing upon a base point $(x_B,y_B)\in EC$, wherein EC represents an elliptic curve defined over F which satisfies the equation $y_2=x^3+ax+b$, and a base point on its twist $$(x_{TB}, \sqrt{\overline{\alpha}}\, y_{TB}) \in TEC,$$

wherein TEC represents the twist of the elliptic curve EC defined over F that satisfies the equation $\overline{\alpha}y^2=x^3+ax+b$, wherein $\overline{\alpha}\in F$ is a non-quadratic residue element of the finite field F, and further, the sending correspondent and the receiving correspondent agree on a random number k, the random number k being the shared secret key for communication;

(b) a second set of instructions which, when loaded into main memory and executed by the processor, causes the processor to compute a scalar multiplication $$(x_{TS_0}, \sqrt{\overline{\alpha}}\, y_{TS_0}) = k(x_{TB}, \sqrt{\overline{\alpha}}\, y_{TB})$$

and set $(x_{S_0},y_{S_0})=(x_k,y_k)$ if $(x_k,\sqrt{\alpha_k}y_k)$ is on the elliptic curve, and if $\alpha_k=\overline{\alpha}$, then performing a scalar multiplication $(x_{S_0},y_{S_0})=k(x_B,y_B)$ and setting $$(x_{TS_0}, \sqrt{\overline{\alpha}}\, y_{TS_0}) = (x_k, \sqrt{\overline{\alpha}}\, y_k),$$

wherein $(x_{S_0},y_{S_0})$ is a 0-th value of shared secret point $(x_S,y_S)$ and $(x_{TS_0},y_{TS_0})$ is a 0-th value of a twist of the shared secret point $(x_{TS},y_{TS})$ at the sending correspondent;

(c) a third set of instructions which, when loaded into main memory and executed by the processor, causes the processor to embed the message N-bit string of the 0-th block into the x-coordinate of an elliptic message point $(x_{m_0},\sqrt{\alpha_{m_0}}y_{m_0})$ using the non-iterative embedding method;

(d) a fourth set of instructions which, when loaded into main memory and executed by the processor, causes the processor to compute a set of message authentication code points $(x_{c_0},y_{c_0})$ and their corresponding twists $(x_{Tc_0},y_{Tc_0})$ if the message point of the 0-th block is on the elliptic curve using $(x_{c_0},y_{c_0})=(x_{m_0},y_{m_0})+(x_{S_0},y_{S_0})$ and $$(x_{Tc_0}, \sqrt{\overline{\alpha}}\, y_{Tc_0}) = (x_{TS_0}, \sqrt{\overline{\alpha}}\, y_{TS_0}),$$

otherwise they are computed using $$(x_{Tc_0}, \sqrt{\overline{\alpha}}\, y_{Tc_0}) = (x_{m_0}, \sqrt{\overline{\alpha}}\, y_{m_0}) + (x_{TS_0}, \sqrt{\overline{\alpha}}\, y_{TS_0})$$

and $(x_{c_0},y_{c_0})=(x_{S_0},y_{S_0})$ at the sending correspondent;

(e) a fifth set of instructions which, when loaded into main memory and executed by the processor, causes the processor to establish an integer i denoting the $i^{th}$ message data block and having an initial value of i=1, then the following sixth through eighth sets of instructions are repeated until all the message data blocks are processed, and incrementing i at each step:

(f) a sixth set of instructions which, when loaded into main memory and executed by the processor, causes the processor to embed the message N-bit string of the i-th block into the x-coordinate of the elliptic message point $(x_{m_i},\sqrt{\alpha_{m_i}}y_{m_i})$ using the non-iterative embedding method at the sending correspondent;

(g) a seventh set of instructions which, when loaded into main memory and executed by the processor, causes the processor to double the points $(x_{S_i},y_{S_i})$ and $(x_{TS_i},y_{TS_i})$ such that $(x_{S_i},y_{S_i})=2(x_{S_{i-1}},y_{S_{i-1}})$ and $$(x_{TS_i}, y_{TS_i}) = 2(x_{TS_{i-1}}, \sqrt{\overline{\alpha}}\, y_{TS_{i-1}});$$

(h) an eighth set of instructions which, when loaded into main memory and executed by the processor, causes the processor to compute the i-th block message authentication code points as $(x_{c_i},y_{c_i})=(x_{m_i},y_{m_i})+(x_{c_{i-1}},y_{c_{i-1}})$ and their twists as $$(x_{Tc_i}, \sqrt{\overline{\alpha}}\, y_{Tc_i}) = (x_{Tc_{i-1}}, \sqrt{\overline{\alpha}}\, y_{Tc_{i-1}})$$

if the message point of the i-th block is on the elliptic curve, otherwise they are computed using $$(x_{Tc_i}, \sqrt{\overline{\alpha}}\, y_{Tc_i}) = (x_{m_i}, \sqrt{\overline{\alpha}}\, y_{m_i}) + (x_{Tc_{i-1}}, \sqrt{\overline{\alpha}}\, y_{Tc_{i-1}})$$

and $(x_{c_i},y_{c_i})=(x_{c_{i-1}},y_{c_{i-1}})$ at the sending correspondent;

(i) a ninth set of instructions which, when loaded into main memory and executed by the processor, causes the processor to concatenate together appropriate bits of the x-coordinate $x_{c_i}$ and a sign bit of the y-coordinate $y_{c_i}$, of the message authentication code point $(x_{c_u},y_{c_u})$, and the appropriate bits of the x-coordinate $x_{Tc_i}$, and the sign bit of the y-coordinate $y_{Tc_i}$ of the twist of the MAC point $$(x_{Tc_u}, \sqrt{\overline{\alpha}}\, y_{Tc_u})$$

to form the message authentication code, which is appended to the message to be sent at the sending correspondent;

(j) a tenth set of instructions which, when loaded into main memory and executed by the processor, causes the processor to embed the bit string of the secret key into the x-coordinate of the key elliptic point $(x_k,\sqrt{\alpha_k}y_k)$ using the non-iterative embedding method at the receiving correspondent;

(k) an eleventh set of instructions which, when loaded into main memory and executed by the processor, causes the processor to perform the scalar multiplication $$(x_{TS_0}, \sqrt{\alpha}\, y_{TS_0}) = k(x_{TB}, \sqrt{\alpha}\, y_{TB})$$

and set $(x_{S_0}, y_{S_0})=(x_k, y_k)$ if $(x_k, \sqrt{\alpha_k} y_k)$ is on the elliptic curve, otherwise if $\alpha_k = \alpha_o$, then performing the scalar multiplication $(x_{S_0}, y_{S_0})=k(x_B, y_B)$ and setting $$(x_{TS_0}, \sqrt{\alpha}\, y_{TS_0}) = (x_k, \sqrt{\alpha}\, y_k)$$

at the receiving correspondent;
(l) a twelfth set of instructions which, when loaded into main memory and executed by the processor, causes the processor to embed a received message N-bit string of the 0-th block into the x-coordinate of a received message elliptic point $(x_{rm_0}, \sqrt{\alpha_{rm_0}}\, y_{rm_0})$ using the non-iterative embedding method;
(m) a thirteenth set of instructions which, when loaded into main memory and executed by the processor, causes the processor to compute received message authentication code points $(x_{rc_0}, y_{rc_0})$ and their corresponding twists $(x_{rTc_0}, y_{rTc_0})$ if the message point of the 0-th block is on the elliptic curve using $(x_{rc_0}, y_{rc_0})=(x_{rm_0}, y_{rm_0})+(x_{S_0}, y_{S_0})$ and $$(x_{rTc_0}, \sqrt{\alpha}\, y_{rTc_0}) = (x_{TS_0}, \sqrt{\alpha}\, y_{TS_0}),$$

otherwise they are computed using $$(x_{rTc_0}, \sqrt{\alpha}\, y_{rTc_0}) = (x_{rm_0}, \sqrt{\alpha}\, y_{rm_0}) + (x_{TS_0}, \sqrt{\alpha}\, y_{TS_0})$$

and $(x_{rc_0}, y_{rc_0})=(x_{S_0}, y_{S_0})$ at the receiving correspondent;
(n) a fourteenth set of instructions which, when loaded into main memory and executed by the processor, causes the processor to initialize i as i=1, then the following fifteenth through eighteenth sets of instructions are repeated until all received message data blocks are processed, and incrementing i at each step:
(o) a fifteenth set of instructions which, when loaded into main memory and executed by the processor, causes the processor to embed the message N-bit string of the i-th block into the x-coordinate of the received elliptic message point $(x_{rm_i}, \sqrt{\alpha_{rm_i}}\, y_{rm_i})$ using the non-iterative embedding method;
(p) a sixteenth set of instructions which, when loaded into main memory and executed by the processor, causes the processor to double the points $(x_{S_i}, y_{S_i})$ and $(x_{TS_i}, y_{TS_i})$, such that $(x_{S_i}, y_{S_i}) = 2(x_{S_{i-1}}, y_{S_{i-1}})$ and $$(x_{TS_i}, y_{TS_i}) = 2(x_{TS_{i-1}}, \sqrt{\alpha}\, y_{TS_{i-1}});$$

(q) a seventeenth set of instructions which, when loaded into main memory and executed by the processor, causes the processor to compute the i-th block received message authentication code points if the message point of the i-th block is on the elliptic curve using $(x_{rc_i}, y_{rc_i})=(x_{rm_i}, y_{rm_i})+(x_{S_i}, y_{S_i})$ and $$(x_{rTc_i}, \sqrt{\alpha}\, y_{rTc_i}) = (x_{rTc_{i-1}}, \sqrt{\alpha}\, y_{rTc_{i-1}}),$$

otherwise they are computed using $$(x_{rTc_i}, \sqrt{\alpha}\, y_{rTc_i}) = (x_{rm_i}, \sqrt{\alpha}\, y_{rm_i}) + (x_{rTc_{i-1}}, \sqrt{\alpha}\, y_{rTc_{i-1}})$$

and $(x_{rc_i}, y_{rc_i})=(x_{rc_{i-1}}, y_{rc_{i-1}})$ at the receiving correspondent;
(r) an eighteenth set of instructions which, when loaded into main memory and executed by the processor, causes the processor to concatenate together appropriate bits of the received x-coordinate $x_{rc_i}$, and the sign bit of the y-coordinate $y_{rc_i}$ of the MAC point $(x_{rc_u}, y_{rc_u})$ and the appropriate bits of the received x-coordinates $x_{rTc_i}$ and the sign bit of the received y-coordinate $y_{rTc_i}$ of the message authentication code point $$(x_{rTc_u}, \sqrt{\alpha}\, y_{rTc_u})$$

to form the message authentication code of the received message at the receiving correspondent; and
(s) a nineteenth set of instructions which, when loaded into main memory and executed by the processor, causes the processor to authenticate the received message if the received message authentication code is equal to the message authentication code of the received message generated at the receiving correspondent.

4. The computer software product as recited in claim 3, wherein the non-iterative embedding method comprises:
(t) a twentieth set of instructions which, when loaded into main memory and executed by the processor, causes the processor to divide the message bit string into N-bit strings and establishing $m_i$ as the $i^{th}$ block;
(u) a twenty-first set of instructions which, when loaded into main memory and executed by the processor, causes the processor to assign the value of the bit string of $m_i$ to $x_{m_i}$;
(v) a twenty-second set of instructions which, when loaded into main memory and executed by the processor, causes the processor to substitute the values of $x_{m_i}$ and computing a value as $t_{m_i}$ as $t_{m_i} = x_{m_i}^3 + ax_{m_i} + b$, wherein if $t_{m_i}$ quadratic residue such that $y_{m_i} = \sqrt{t_{m_i}}$ then a temporary message point $(x_{m_i}, y_{m_i})$ is established, and if $t_{m_i}$ is non-quadratic residue such that $$y_{m_i} = \sqrt{\frac{t_{m_i}}{\alpha}}$$

then the temporary message point is established as $$(x_{m_i}, \sqrt{\alpha}\, y_{m_i}),$$

wherein $$\sqrt{\alpha} \neq 0;$$

and
(w) a twenty-third set of instructions which, when loaded into main memory and executed by the processor, causes the processor to establish a message point $(x_{m_i}, \sqrt{\alpha_{m_i}}\, y_{m_i})$, wherein the message point is on the elliptic curve if $\alpha_{m_i} = 1$, and the message point is on the twist of the elliptic curve if $\alpha_{m_i} = \overline{\alpha}$.

5. A computer software product that includes a non-transitory storage medium readable by a processor, the non-transitory storage medium having stored thereon a set of instructions for generating an elliptic-curve based message authentication code, the instructions comprising:

(a) a first set of instructions which, when loaded into main memory and executed by the processor, causes the processor to embed a bit string of a shared secret key into an x-coordinator of a key elliptic point $(x_k, \sqrt{\alpha_k} y_k)$ using a non-iterative embedding method at a sending correspondent and assign a vector $S_{m_i}$ to represent an N-bit string of an i-th message block, wherein the sending correspondent and a receiving correspondent agree upon a set of coefficients a and b such that a,b $\in$ F, wherein F represents a finite field wherein the elements of F can be represented using (N+1) bits, wherein N is a natural number, and further agreeing upon a base point $(x_B, y_B)$ $\in$EC, wherein EC represents an elliptic curve defined over F which satisfies the equation $y^2 = x^3 + ax + b$, and a base point on its twist $$(x_{TB}, \sqrt{\overline{\alpha}}\, y_{TB}) \in TEC,$$

wherein TEC represents the twist of the elliptic curve EC defined over F that satisfies the equation $\overline{\alpha} y^2 = x^3 + ax + b$, wherein $\overline{\alpha} \in F$ is a non-quadratic residue element of the finite field F, and further, the sending correspondent and the receiving correspondent agree on a random number k, the random number k being the shared secret key for communication, ;

(b) a second set of instructions which, when loaded into main memory and executed by the processor, causes the processor to compute a scalar multiplication $$(x_{TS_0}, \sqrt{\overline{\alpha}}\, y_{TS_0}) = k(x_{TB}, \sqrt{\overline{\alpha}}\, y_{TB})$$

and set $(x_{S_0}, y_{S_0}) = (x_k, y_k)$ if $(x_k, \sqrt{\alpha_k} y_k)$ is on the elliptic curve, and if $\alpha_k = \overline{\alpha}$, then performing a scalar multiplication $(x_{S_0}, y_{S_0}) = k(x_B, y_B)$ and setting $$(x_{TS_0}, \sqrt{\overline{\alpha}}\, y_{TS_0}) = (x_k, \sqrt{\overline{\alpha}}\, y_k),$$

wherein $(x_{S_0}, y_{S_0})$ is a 0-th value of shared secret point $(x_S, y_S)$ and $(x_{TS_0}, y_{TS_0})$ is a 0-th value of a twist of the shared secret point $(x_{TS}, y_{TS})$ at the sending correspondent;

(c) a third set of instructions which, when loaded into main memory and executed by the processor, causes the processor to compute the N-bit string $S_{m_0}'$ as $S_{m_0}' = S_{m_0} \oplus S_{m_{-1}}$ and then embed the message N-bit string $S_{m_0}'$ of the 0-th block into the x-coordinate of the elliptic message point $(x_{m_0}, \sqrt{\alpha_{m_0}} y_{m_0})$ using the non-iterative embedding method at the sending correspondent;

(d) a fourth set of instructions which, when loaded into main memory and executed by the processor, causes the processor to compute a set of message authentication code points $(x_{c_0}, y_{c_0})$ and their corresponding twists $(x_{Tc_0}, y_{Tc_0})$ if the message point of the 0-th block is on the elliptic curve using $(x_{c_0}, y_{c_0}) = (x_{m_0}, y_{m_0}) + (x_{S_0}, y_{S_0})$ and $$(x_{Tc_0}, \sqrt{\overline{\alpha}}\, y_{Tc_0}) = (x_{TS_0}, \sqrt{\overline{\alpha}}\, y_{TS_0}),$$

otherwise they are computed using $$(x_{Tc_0}, \sqrt{\overline{\alpha}}\, y_{Tc_0}) = (x_{m_0}, \sqrt{\overline{\alpha}}\, y_{m_0}) + (x_{TS_0}, \sqrt{\overline{\alpha}}\, y_{TS_0})$$

and $(x_{c_0}, y_{c_0}) = (x_{S_0}, y_{S_0})$ at the sending correspondent;

(e) a fifth set of instructions which, when loaded into main memory and executed by the processor, causes the processor to establish an integer i denoting the $i^{th}$ message data block and having an initial value of i=1, then the following sixth through eighth sets of instructions are repeated until all the message data blocks are processed, and incrementing i at each step:

(f) a sixth set of instructions which, when loaded into main memory and executed by the processor, causes the processor to compute the N-bit string $S_{m_i}'$ as $S_{m_i}' = S_{m_i} \oplus S_{m_{i-1}}$, and embed the message N-bit string of the i-th block into the x-coordinate of the elliptic message point $(x_{m_i}, \sqrt{\alpha_{m_i}}, y_{m_i})$ using the non-iterative embedding method at the sending correspondent;

(g) a seventh set of instructions which, when loaded into main memory and executed by the processor, causes the processor to double the points $(x_{S_i}, y_{S_i})$ and $(x_{TS_i}, y_{TS_i})$ such that $(x_{S_i}, y_{S_i}) = 2(x_{S_{i-1}}, y_{S_{i-1}})$ and $$(x_{TS_i}, y_{TS_i}) = 2(x_{TS_{i-1}}, \sqrt{\overline{\alpha}}\, y_{TS_{i-1}});$$

(h) an eighth set of instructions which, when loaded into main memory and executed by the processor, causes the processor to compute the i-th block message authentication code points as $(x_{c_i}, y_{c_i}) = (x_{m_i}, y_{m_i}) + (x_{c_{i-1}}, y_{c_{i-1}})$ and their twists as $$(x_{Tc_i}, \sqrt{\overline{\alpha}}\, y_{Tc_i}) = (x_{Tc_{i-1}}, \sqrt{\overline{\alpha}}\, y_{Tc_{i-1}})$$

if the message point of the i-th block is on the elliptic curve, otherwise they are computed using $$(x_{Tc_i}, \sqrt{\overline{\alpha}}\, y_{Tc_i}) = (x_{m_i}, \sqrt{\overline{\alpha}}\, y_{m_i}) + (x_{Tc_{i-1}}, \sqrt{\overline{\alpha}}\, y_{Tc_{i-1}})$$

and $(x_{c_i}, y_{c_i}) = (x_{c_{i-1}}, y_{c_{i-1}})$ at the sending correspondent;

(i) a ninth set of instructions which, when loaded into main memory and executed by the processor, causes the processor to concatenate together appropriate bits of the x-coordinate $x_{c_i}$ and a sign bit of the y-coordinate $y_{c_i}$ of the message authentication code point $(x_{c_u}, y_{c_u})$ and the appropriate bits of the x-coordinate $x_{Tc_i}$, and the sign bit of the y-coordinate $y_{Tc_i}$ of the twist of the MAC point $$(x_{Tc_0}, \sqrt{\overline{\alpha}}\, y_{Tc_0})$$

to form the message authentication code, which is appended to the message to be sent at the sending correspondent;

(j) a tenth set of instructions which, when loaded into main memory and executed by the processor, causes the processor to embed the bit string of the secret key into the x-coordinate of the key elliptic point $(x_k,\sqrt{\alpha_k}y_k)$ using the non-iterative embedding method at the receiving correspondent;

(k) an eleventh set of instructions which, when loaded into main memory and executed by the processor, causes the processor to perform the scalar multiplication $$(x_{TS_0}, \sqrt{\alpha}\, y_{TS_0}) = k(x_{TB}, \sqrt{\alpha}\, y_{TB})$$

and set $(x_{S_0},y_{S_0})=(x_k,y_k)$ if $(x_k,\sqrt{\alpha_k}y_k)$ is on the elliptic curve, otherwise if $\alpha_k=\overline{\alpha}$, then performing the scalar multiplication $(x_{S_0},y_{S_0})=k(x_B,y_B)$ and setting $$(x_{TS_0}, \sqrt{\alpha}\, y_{TS_0}) = (x_k, \sqrt{\alpha}\, y_k)$$

at the receiving correspondent;

(l) a twelfth set of instructions which, when loaded into main memory and executed by the processor, causes the processor to compute the N-bit string $S_{rm_0}'$ as $S_{rm_0}'=S_{rm_0} \oplus S_{rm_{-1}}$, and embed a received message N-bit string of the 0-th block into the x-coordinate of a received message elliptic point $(x_{rm_0},\sqrt{\alpha_{rm_0}}y_{rm_0})$ using the non-iterative embedding method at the receiving correspondent;

(m) a thirteenth set of instructions which, when loaded into main memory and executed by the processor, causes the processor to compute received message authentication code points $(x_{rc_0},y_{rc_0})$ and their corresponding twists $(x_{rTc_0},y_{rTc_0})$ if the message point of the 0-th block is on the elliptic curve using $(x_{rc_0},y_{rc_0})=(x_{rm_0},y_{rm_0})+(x_{S_0},y_{S_0})$ and $$(x_{rTc_0}, \sqrt{\alpha}\, y_{rTc_0}) = (x_{TS_0}, \sqrt{\alpha}\, y_{TS_0}),$$

otherwise they are computed using $$(x_{rTc_0}, \sqrt{\alpha}\, y_{rTc_0}) = (x_{rm_0}, \sqrt{\alpha}\, y_{rm_0}) + (x_{TS_0}, \sqrt{\alpha}\, y_{TS_0})$$

and $(x_{rc_0},y_{rc_0})=(x_{S_0},y_{S_0})$ at the receiving correspondent;

(n) a fourteenth set of instructions which, when loaded into main memory and executed by the processor, causes the processor to initialize i as i=1, then the following fifteenth through eighteenth sets of instructions are repeated until all received message data blocks are processed, and incrementing i at each step:

(o) a fifteenth set of instructions which, when loaded into main memory and executed by the processor, causes the processor to compute the N-bit string $S_{rm_i}'$ as $S_{rm_i}'=S_{rm_i} \oplus S_{rm_{i-1}}$ and embed the message N-bit string of the i-th block into the x-coordinate of the received elliptic message point $(x_{rm_i},\sqrt{\alpha_{rm_i}}y_{rm_i})$ using the non-iterative embedding method;

(p) a sixteenth set of instructions which, when loaded into main memory and executed by the processor, causes the processor to double the points $(x_{S_i},y_{S_i})$ and $(x_{TS_i},y_{TS_i})$, such that $(x_{S_i},y_{S_i})=2(x_{S_{i-1}},y_{S_{i-1}})$ and $$(x_{TS_i}, y_{TS_i}) = 2(x_{TS_{i-1}}, \sqrt{\alpha}\, y_{TS_{i-1}});$$

(q) a seventeenth set of instructions which, when loaded into main memory and executed by the processor, causes the processor to compute the i-th block received message authentication code points if the message point of the i-th block is on the elliptic curve using $(x_{rc_i},y_{rc_i})=(x_{rm_i},y_{rm_i})+(x_{S_i},y_{S_i})$ and $$(x_{rTc_i}, \sqrt{\alpha}\, y_{rTc_i}) = (x_{rTc_{i-1}}, \sqrt{\alpha}\, y_{rTc_{i-1}}),$$

otherwise they are computed using $$(x_{rTc_i}, \sqrt{\alpha}\, y_{rTc_i}) = (x_{rm_i}, \sqrt{\alpha}\, y_{rm_i}) + (x_{rTc_{i-1}}, \sqrt{\alpha}\, y_{rTc_{i-1}})$$

and $(x_{rc_i},y_{rc_i})=(x_{rc_{i-1}},y_{rc_{i-1}})$ at the receiving correspondent;

(r) an eighteenth set of instructions which, when loaded into main memory and executed by the processor, causes the processor to concatenate together appropriate bits of the received x-coordinate $x_{rc_i}$ and the sign bit of the received y-coordinate $y_{rc_i}$ of the message authentication code point $(x_{rc_u},y_{rc_u})$, and the appropriate bits of the received x-coordinate $x_{rTc_i}$ and the sign bit of the received y-coordinate $y_{rTc_i}$ of the message authentication code point $$(x_{rTc_u}, \sqrt{\alpha}\, y_{rTc_u})$$

to form the message authentication code of the received message; and (s) a nineteenth set of instructions which, when loaded into main memory and executed by the processor, causes the processor to authenticate the received message if the received message authentication code is equal to the message authentication code of the received message generated at the receiving correspondent.

6. The computer software product as recited in claim 5, wherein the non-iterative embedding method comprises:

(t) a twentieth set of instructions which, when loaded into main memory and executed by the processor, causes the processor to divide the message bit string into N-bit strings and establishing $m_i$, as the $i^{th}$ block;

(u) a twenty-first set of instructions which, when loaded into main memory and executed by the processor, causes the processor to assign the value of the bit string of $m_i$ to $x_{m_i}$;

(v) a twenty-second set of instructions which, when loaded into main memory and executed by the processor, causes the processor to substitute the values of $x_{m_i}$ and computing a value $t_{m_i}$ as $t_{m_i}=x_{m_i}^3+ax_{m_i}+b$, wherein if $t_{m_i}$ is quadratic residue such that $y_{m_i}=\sqrt{t_{m_i}}$ then a temporary message point $(x_{m_i},y_{m_i})$ is established, and if $t_{m_i}$ is non-quadratic residue such that $$y_{m_i} = \sqrt{\frac{t_{m_i}}{\alpha}}$$

then the temporary message point is established as $$(x_{m_i}, \sqrt{\alpha}\, y_{m_i}),$$

wherein $$\sqrt{\alpha} \neq 0;$$

and (w) a twenty-third set of instructions which, when loaded into main memory and executed by the processor, causes the processor to establish a message point $(x_{m_i},\sqrt{\alpha_{m_i}}y_{m_i})$, wherein the message point is on the elliptic curve if $\alpha_{m_i}=1$, and the message point is on the twist of the elliptic curve if $\alpha_{m_i}=\overline{\alpha}$.

* * * * *